US008046581B2

(12) United States Patent
Netanel

(10) Patent No.: US 8,046,581 B2
(45) Date of Patent: Oct. 25, 2011

(54) METHOD AND APPARATUS FOR SECURE IMMEDIATE WIRELESS ACCESS IN A TELECOMMUNICATIONS NETWORK

(75) Inventor: Eran Netanel, Belmont, CA (US)

(73) Assignee: Telespree Communications, San Francisco, CA (US)

( * ) Notice: Subject to any disclaimer, the term of this patent is extended or adjusted under 35 U.S.C. 154(b) by 1099 days.

(21) Appl. No.: 11/691,388

(22) Filed: Mar. 26, 2007

(65) Prior Publication Data

US 2008/0026740 A1      Jan. 31, 2008

Related U.S. Application Data

(63) Continuation-in-part of application No. 10/136,712, filed on Apr. 30, 2002, now Pat. No. 7,197,301.

(60) Provisional application No. 60/361,816, filed on Mar. 4, 2002.

(51) Int. Cl.
    *H04M 3/00* (2006.01)

(52) U.S. Cl. ........ 713/168; 455/411; 455/558; 455/557; 455/456.1; 455/414.1; 455/419; 455/466; 455/418; 455/452.1; 455/527; 455/524; 455/410; 709/221; 709/245; 709/219; 709/230; 709/218; 713/171; 713/169; 713/2; 705/64

(58) Field of Classification Search ................... 455/411, 455/558, 557, 456, 414, 419, 566, 418, 452, 455/527, 524, 410; 709/221, 245, 219, 230, 709/218; 713/200, 169, 2, 171; 705/64

See application file for complete search history.

(56) References Cited

U.S. PATENT DOCUMENTS

| 4,706,275 | A | 11/1987 | Kamil |
| 4,756,020 | A | 7/1988 | Fodale |
| 4,776,000 | A | 10/1988 | Parienti |
| 4,776,003 | A | 10/1988 | Harris |
| 4,831,647 | A | 5/1989 | D'Avello et al. |
| 4,845,740 | A | 7/1989 | Tokuyama et al. |
| 4,845,772 | A | 7/1989 | Metroka et al. |
| 4,852,149 | A | 7/1989 | Zwick et al. |

(Continued)

FOREIGN PATENT DOCUMENTS

DE          19528423         2/1997

(Continued)

OTHER PUBLICATIONS

Gruman, G., *Taking IT to the streets: 3G arrives—Broadband cellular service means the office can travel wherever the road warrior may roam*, Mar. 7, 2005, InfoWorld, 27, 10, 17.

*Primary Examiner* — Pierre-Louis Desir
*Assistant Examiner* — Joshua Schwartz
(74) *Attorney, Agent, or Firm* — Michael A. Glenn; Glenn Patent Group

(57) ABSTRACT

A wireless telephone and messaging system provides Secure Immediate Wireless Access (SIWA) to wireless telephones onto existing wireless networks. The SIWA protocol uses existing wireless network messaging to exchange information between wireless devices and a network server, referred to herein as an Intelligent Service Manager (ISM). The ISM acts as a gateway between wireless devices and wireless service provider, and provides the wireless devices with an immediate limited or unlimited access to the wireless network. The ISM can also deny access to the wireless network from unauthorized wireless devices.

21 Claims, 16 Drawing Sheets

U.S. PATENT DOCUMENTS

| | | |
|---|---|---|
| 4,860,341 A | 8/1989 | D'Avello et al. |
| 4,897,873 A | 1/1990 | Beutler et al. |
| 4,945,557 A | 7/1990 | Kaneuchi et al. |
| 4,951,308 A | 8/1990 | Bishop et al. |
| 5,042,063 A | 8/1991 | Sakanishi et al. |
| 5,046,088 A | 9/1991 | Margulies |
| 5,127,040 A | 6/1992 | D'Avello et al. |
| 5,138,650 A | 8/1992 | Stahl et al. |
| 5,144,649 A | 9/1992 | Zicker et al. |
| 5,185,790 A | 2/1993 | Mischneko |
| 5,202,912 A | 4/1993 | Breeden et al. |
| 5,233,642 A | 8/1993 | Renton |
| 5,247,700 A | 9/1993 | Wohl et al. |
| 5,265,155 A | 11/1993 | Castro |
| 5,274,802 A | 12/1993 | Altine |
| 5,291,543 A | 3/1994 | Freese et al. |
| 5,297,189 A | 3/1994 | Chabernaud |
| 5,301,223 A | 4/1994 | Amadon et al. |
| 5,301,234 A | 4/1994 | Mazziotto et al. |
| 5,309,501 A | 5/1994 | Kozik et al. |
| 5,321,735 A | 6/1994 | Breeden et al. |
| 5,327,144 A | 7/1994 | Stilp et al. |
| 5,341,414 A | 8/1994 | Popke |
| 5,353,335 A | 10/1994 | D'Urso et al. |
| 5,359,182 A | 10/1994 | Schilling |
| 5,359,642 A | 10/1994 | Castro |
| 5,386,455 A | 1/1995 | Cooper |
| 5,440,621 A | 8/1995 | Castro |
| 5,452,340 A | 9/1995 | Engelbeck et al. |
| 5,469,497 A | 11/1995 | Pierce et al. |
| 5,475,791 A | 12/1995 | Schalk et al. |
| 5,499,288 A | 3/1996 | Hunt et al. |
| 5,509,056 A | 4/1996 | Ericsson et al. |
| 5,517,555 A | 5/1996 | Amadon et al. |
| 5,517,558 A | 5/1996 | Schalk |
| 5,517,559 A | 5/1996 | Hayashi et al. |
| 5,574,771 A | 11/1996 | Driessen et al. |
| 5,579,376 A | 11/1996 | Kennedy, III et al. |
| 5,592,535 A | 1/1997 | Klotz |
| 5,651,056 A | 7/1997 | Eting et al. |
| 5,659,597 A | 8/1997 | Bareis et al. |
| 5,706,399 A | 1/1998 | Bareis |
| 5,719,926 A | 2/1998 | Hill |
| 5,722,067 A | 2/1998 | Fougnies et al. |
| 5,732,346 A | 3/1998 | Lazaridis et al. |
| 5,737,707 A | 4/1998 | Gaulke et al. |
| 5,754,645 A | 5/1998 | Metroka et al. |
| 5,761,618 A | 6/1998 | Lynch |
| 5,778,313 A | 7/1998 | Fougnies |
| 5,790,636 A | 8/1998 | Marshall |
| 5,794,195 A | 8/1998 | Hormann et al. |
| 5,802,470 A | 9/1998 | Gaulke |
| 5,809,124 A | 9/1998 | Bayod |
| 5,812,945 A | 9/1998 | Hansen et al. |
| 5,815,807 A | 9/1998 | Osmani et al. |
| 5,826,185 A | 10/1998 | Wise et al. |
| 5,845,246 A | 12/1998 | Schalk |
| 5,848,360 A | 12/1998 | O'Connell et al. |
| 5,854,975 A | 12/1998 | Fougnies et al. |
| 5,875,394 A | 2/1999 | Daly et al. |
| 5,881,134 A | 3/1999 | Foster et al. |
| 5,887,253 A | 3/1999 | O'Neil et al. |
| 5,909,485 A | 6/1999 | Martin et al. |
| 5,915,226 A | 6/1999 | Martineau |
| 5,940,775 A | 8/1999 | Kim |
| 5,963,859 A | 10/1999 | Keating |
| 5,965,848 A | 10/1999 | Altschul et al. |
| 5,966,654 A | 10/1999 | Croughwell et al. |
| 5,983,091 A | 11/1999 | Rodriguez et al. |
| 6,014,561 A | 1/2000 | Molne |
| 6,029,062 A | 2/2000 | Hanson |
| 6,049,710 A | 4/2000 | Nilsson |
| 6,058,300 A | 5/2000 | Hanson |
| 6,065,120 A | 5/2000 | Laursen et al. |
| 6,101,378 A | 8/2000 | Barabash et al. |
| 6,115,601 A | 9/2000 | Ferreira |
| 6,131,024 A | 10/2000 | Boltz |
| 6,144,653 A | 11/2000 | Persson et al. |
| 6,144,849 A | 11/2000 | Nodoushani et al. |
| 6,167,251 A | 12/2000 | Segal et al. |
| 6,195,546 B1 | 2/2001 | Leung et al. |
| 6,212,372 B1 | 4/2001 | Julin |
| 6,226,364 B1 | 5/2001 | O'Neil |
| 6,275,693 B1 | 8/2001 | Lin et al. |
| 6,381,454 B1 | 4/2002 | Tiedemann et al. |
| 6,418,310 B1 | 7/2002 | Dent |
| 6,453,162 B1 | 9/2002 | Gentry |
| 6,463,276 B1 | 10/2002 | Jonsson |
| 6,466,779 B1 | 10/2002 | Moles |
| 6,529,729 B1* | 3/2003 | Nodoushani et al. ......... 455/419 |
| 6,577,857 B1 | 6/2003 | Rodriguez |
| 6,591,364 B1 | 7/2003 | Patel |
| 6,615,059 B1 | 9/2003 | Pehrsson et al. |
| 6,628,934 B2 | 9/2003 | Rosenberg et al. |
| 6,647,426 B2 | 11/2003 | Mohammed |
| 6,654,600 B1 | 11/2003 | Pollak et al. |
| 6,671,731 B1* | 12/2003 | Cain ............................ 709/230 |
| 6,690,930 B1 | 2/2004 | Dupre |
| 6,725,056 B1 | 4/2004 | Moles et al. |
| 6,778,525 B1 | 8/2004 | Baum |
| 6,782,422 B1 | 8/2004 | Bahl et al. |
| 6,829,250 B2 | 12/2004 | Voit |
| 6,836,651 B2 | 12/2004 | Segal et al. |
| 6,871,193 B1 | 3/2005 | Campbell et al. |
| 6,912,256 B1 | 6/2005 | Noblet |
| 7,194,756 B2 | 3/2007 | Addington et al. |
| 7,266,371 B1 | 9/2007 | Amin et al. |
| 7,305,090 B1 | 12/2007 | Hayes et al. |
| 2002/0004935 A1 | 1/2002 | Huotari et al. |
| 2002/0094808 A1 | 7/2002 | Tiedemann, et al. |
| 2002/0107729 A1 | 8/2002 | Katz |
| 2002/0147019 A1 | 10/2002 | Uhlik et al. |
| 2002/0160815 A1 | 10/2002 | Patel et al. |
| 2002/0169966 A1 | 11/2002 | Nyman et al. |
| 2002/0174073 A1 | 11/2002 | Nordman et al. |
| 2003/0013434 A1 | 1/2003 | Rosenberg et al. |
| 2003/0027581 A1 | 2/2003 | Jokinen et al. |
| 2003/0061503 A1 | 3/2003 | Katz et al. |
| 2003/0083068 A1 | 5/2003 | Wong |
| 2003/0101246 A1 | 5/2003 | Lahti |
| 2003/0114149 A1 | 6/2003 | Lehtonen et al. |
| 2003/0115261 A1 | 6/2003 | Mohammed |
| 2003/0119489 A1 | 6/2003 | Mohammed |
| 2003/0119490 A1 | 6/2003 | Mohammed |
| 2004/0110497 A1 | 6/2004 | Little |
| 2004/0133668 A1* | 7/2004 | Nicholas, III ................ 709/223 |
| 2004/0218045 A1 | 11/2004 | Bodnar et al. |
| 2004/0261114 A1 | 12/2004 | Addington et al. |
| 2004/0261126 A1 | 12/2004 | Addington et al. |
| 2005/0102529 A1 | 5/2005 | Buddhikot et al. |
| 2005/0108423 A1 | 5/2005 | Centemeri |
| 2005/0181793 A1 | 8/2005 | Netanel |
| 2005/0207395 A1 | 9/2005 | Mohammed |
| 2005/0266853 A1 | 12/2005 | Gallagher et al. |
| 2005/0271008 A1 | 12/2005 | Gallagher et al. |
| 2006/0025132 A1 | 2/2006 | Karaoguz et al. |
| 2006/0114897 A1 | 6/2006 | Suri et al. |
| 2006/0116507 A1 | 6/2006 | Oppermann et al. |
| 2006/0143438 A1 | 6/2006 | Wu et al. |
| 2006/0256813 A1 | 11/2006 | Brusca et al. |
| 2006/0291455 A1 | 12/2006 | Katz et al. |
| 2007/0060097 A1 | 3/2007 | Edge et al. |
| 2007/0074240 A1 | 3/2007 | Addington et al. |
| 2007/0124488 A1 | 5/2007 | Baum et al. |

FOREIGN PATENT DOCUMENTS

| | | |
|---|---|---|
| EP | 262685 | 4/1988 |
| EP | 1189473 | 3/2002 |
| EP | 1587292 | 10/2005 |
| EP | 1791315 | 5/2007 |
| FR | 2696067 | 3/1994 |
| WO | WO 96/03001 | 2/1996 |
| WO | WO9740616 | 10/1997 |
| WO | WO0025454 | 5/2000 |
| WO | WO0163900 | 8/2001 |
| WO | WO0214980 | 2/2002 |
| WO | WO0215493 | 2/2002 |

| | | |
|---|---|---|
| WO | WO0215494 | 2/2002 |
| WO | WO0273985 | 9/2002 |
| WO | WO02078365 | 10/2002 |
| WO | WO02093811 | 11/2002 |
| WO | WO02103546 | 12/2002 |
| WO | WO03007633 | 1/2003 |
| WO | WO03039103 | 5/2003 |
| WO | WO2004014089 | 2/2004 |
| WO | WO2004049678 | 6/2004 |
| WO | WO2004049680 | 6/2004 |
| WO | WO2005001640 | 1/2005 |
| WO | WO2005048034 | 5/2005 |
| WO | WO 2005076564 A1 * | 8/2005 |
| WO | WO2005114918 | 12/2005 |
| WO | WO2006029297 | 3/2006 |
| WO | WO2006044667 | 4/2006 |
| WO | WO2006124505 | 11/2006 |
| WO | WO2007002034 | 1/2007 |
| WO | WO2007002604 | 1/2007 |
| WO | WO2007059169 | 5/2007 |
| WO | WO2007059183 | 5/2007 |

* cited by examiner

METHOD AND APPARATUS FOR SECURE IMMEDIATE WIRELESS ACCESS IN A TELECOMMUNICATIONS NETWORK

CROSS-REFERENCE TO RELATED APPLICATIONS

This application is a continuation-in-part of U.S. patent application Ser. No. 10/136,712, filed Apr. 30, 2002 now U.S. Pat. No. 7,197,301, which claims benefit of U.S. provisional patent application Ser No. 60/361,816 filed Mar. 4, 2002.

BACKGROUND OF THE INVENTION

1. Technical Field

The invention relates to telecommunications. More particularly, the invention relates to a method and apparatus for secure, immediate, wireless access in a telecommunications network.

2. Description of the Prior Art

Many useful voice and data wireless applications are not cost-effective for carriers to support because the cost of provisioning the network and devices can be greater than the revenue generated from the service. Implementing instant wireless activation and provisioning eliminates the need for call center agents to provide basic device provisioning and activation services, increasing provisioning speed and accuracy. In addition, the technology infrastructure used for instant activation and provisioning inherently supports Wireless Sessions in which network resources are used only on demand.

This allows carriers to support more customers with the same network resources. The cost-savings resulting from instant wireless activation, provisioning and Wireless Sessions can enable carriers to increase operating margins across all markets, and profitably serve lower ARPU and intermittent-use applications such as prepaid wireless phones. This capability is critical to overall carrier competitive success because of the fast market growth and high overall revenue potential for these applications.

In today's markets, wireless operators are facing three key issues: falling ARPU, the need to reduce acquisition costs and the need to reduce the cost of operating and maintaining customers. Operators are spending millions of dollars in device activation and provisioning costs today, a cost believed to be constant and unchangeable.

Furthermore, the potential of wireless applications is expanding to include a wide variety of high-volume, intermittent wire-less use scenarios such as wireless modems, telemetry transmitters, emergency-only devices and wireless handset rentals for business and vacation travelers. While the overall revenue potential for serving this market is enormous, many of these applications could cost more to provision than the carriers would realize in profits. This is true because wireless carriers commonly come from a landline background, and use the call center-based methodology for service provisioning that is traditional for that market.

The call center-based provisioning process requires the customer to use a landline telephone to access an agent in the carrier's call center. The agent collects information such as the customer's location, credit information, equipment description, and services requested. This information is entered manually into a proprietary system, which relays it to the many internal systems required to provision the wireless network for device activation. The agent may also provide verbal device provisioning instructions to the user, who then activates the device manually.

Some of the information provided to the agent during the provisioning process, such as the customer's address, requires basic data entry on the part of the operator. Other elements require action by the agent, such as checking credit history and ensuring that the device the customer wants to activate is certified and has been purchased through appropriate channels.

When customers sign up for extended service contracts with a set monthly fee, the call center-based approach to provisioning, while expensive, is financially viable. Today, a new class of wireless users is emerging that does not ensure fixed monthly revenue. These users want to take advantage of applications in which wireless use may be pre-paid, infrequent, for emergency only, or machine-to-machine.

While the overall revenue potential for serving this emerging high volume, intermittent-use market is enormous, many of these applications cost more to provision than the carriers would realize in profits under the traditional call center-based provisioning scenario. Even though network costs per user are reduced as more customers are added to the network, there is no corresponding economy of scale on the provisioning side. For these users, the traditional approach to provisioning is not necessarily financially viable for carriers.

SUMMARY OF THE INVENTION

The preferred embodiment of the invention comprises a wireless device and messaging system that provides Secure Immediate Wireless Access (SIWA) to wireless device onto existing wireless networks, such as GSM, CDMA, TDMA, and analog (AMPS). The SIWA protocol uses existing wireless network messaging to exchange information between wireless devices and a network server, referred to herein as an Intelligent Service Manager (ISM). The ISM acts as a gateway between wireless devices and wireless service providers, and provides the wireless devices with an immediate limited or unlimited access to the wireless network. The ISM can also deny access to the wireless network from unauthorized wireless devices.

DETAILED DESCRIPTION OF THE INVENTION

Abbreviations, Acronyms and Definitions

Figure 1A:
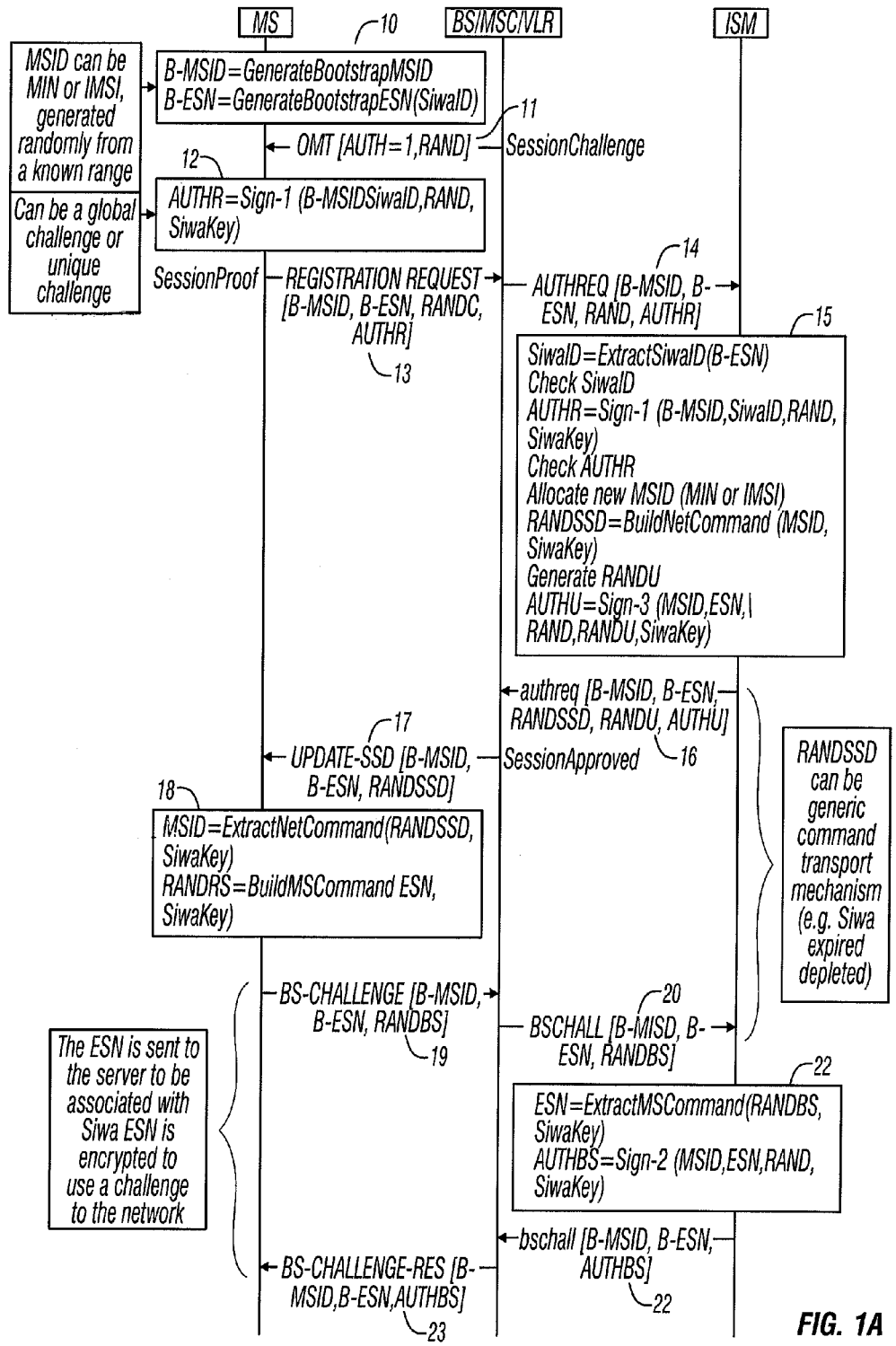
FIGS. 1A and 1B is a flow diagram of a bootstrap process for CDMA/TDMA/analog systems using an SSD update procedure with global challenge according to the invention.

A number of acronyms and abbreviations are used throughout the following description. For convenience, definitions of these abbreviations and acronyms are given herein below:

BNAI: Bootstrap Network Access Identifier:
AT: Access Terminal, referring to a wireless device to be activated, with which a user accesses the network;
AN: Access Node—the base station;
AN-AAA: Access Node—Authentication, Authorization and Accounting server;
SSS: Self-Service Server;
CHAP: Challenge, Handshake, and Authentication Protocol;
BMSID: Bootstrap Mobile Station Identifier:
Serial ID: Serial Number;
MSID: Mobile Station Identifier
MN ID: Mobile Node Identifier
NAIS: user ID submitted for PPP authentication;
PCF: Packet Control Function;
ESN: Electronic Serial Number;
MEID: Mobile Equipment Identifier, an extended version of ESN;
MDN: Mobile Device Number:
PDSN: Packet Data Switching Node;
UATI: Unicast Access Terminal Identifier;
LCP: Link Control Protocol;
RRQ: Registration Request;
RRP: Registration Reply;
HA: Home Agent;
FA: Foreign Agent;
WAP: Wireless Application Protocol; and
UDR: Usage Detail Record.

The preferred embodiment of the invention comprises a wireless telephone and messaging system that provides Secure Immediate Wireless Access (SIWA) to wireless telephones onto existing wireless networks, such as GSM, CDMA, TDMA, and analog (AMPS). The SIWA protocol uses existing wireless network messaging to exchange information between wireless devices (MS) and a network server, referred to herein as an Intelligent Service Manager (ISM). The ISM acts as a gateway between wireless devices and wireless service providers, and provides the wireless devices with an immediate limited or unlimited access to the wireless network. The ISM can also deny access to the wireless network from unauthorized wireless devices.

One benefit to wireless service providers is lower operational costs increasing marginal returns associated with subscriber acquisition.

Another benefit to wireless service providers is the market opportunity increases the user base by offering wireless communications for new purposes (e.g. telemetry, telematics) as well as new distribution channels (e.g. convenience stores).

A benefit to wireless users is the easy access to services offered by wireless service provider with no preliminary obligations and instant gratification. Furthermore, wireless devices that are configured to work with multiple service providers allow the user to selectively choose between them.

To service providers, the ISM is a trusted gatekeeper that allows them to provide services with an automated subscriber management and network resource assignment.

In comparison to existing over-the-air activation solutions, the herein disclosed SIWA does not require the implementation of extensions to existing wireless network protocols, nor does it require changes to existing wireless network elements, such as BTS, BSC, MSC, VLR, HLR and/or AC. The invention makes an efficient use of Mobile Station ID (MSID, also known as IMSI in GSM, MIN in TDMA and Analog, and MIN or IMSI in CDMA) by allocating them on a session basis where session can be dynamically defined, e.g. time or capacity limits. Business model logic can also include additional information needed to manage sessions. Such information might include rules on account/session expiration, phone number recycling, phone number multiplexing requirements, and interaction with other network-based applications. For example, a conventional prepaid subscription can be defined as a session that starts when a user purchase its initial airtime and end after no airtime is being purchased for a pre-determined time. A telemetry wireless device (a transmitter) example might define a session that start every time the device registers on the network and end when its transmitted message is sent to destination.

An important benefit of the invention is the efficient assignment of MSDN (also known as MSISDN in GSM or MDN in CDMA/TDMA/Analog) on a per need basis.

For purposes of the discussion herein, the wireless device is identified in the figures by the designation MS, the network elements are identified in the figures by the designation BS/MSC/VLR, and the intelligent service manager is identified in the figures by the designation ISM.

The presently preferred embodiment of SIWA is composed of two major layers:

SIWA Abstraction Layer

This layer concerns Wireless Sessions, which provide a limited or unlimited proof to use a particular service. Such limit could be, for example, time based, usage based, content based, or single use. The Wireless Session is comprised of a <SiwaID, SiwaKey> pair, which uniquely identifies the Wireless Session and proves it is authentic, genuine, and valid. Note that the SiwaID is unique among Wireless Sessions and includes the services with which it is associated. The process of acquiring a Wireless Session is referred to herein as a bootstrap process.

In connection with the preferred embodiment of the invention, the abstraction layer primarily concerns the following Wireless Session Operations:

Operations Associated with Session Purchase at First Network Access

SessionPromote—an operation invoked by ISM to provide the user with an option to purchase a session for a service.
SessionPurchase—an operation invoked by user/device to purchase a session for a service.
SessionGranted—an operation invoked by ISM to provide the user with the <SiwaID, SiwaKey> of a valid session.
SessionDenied—an operation invoked by ISM to provide the user with the reason of the purchase failure.

Operations Associated with Service Access

SessionChallenge—an operation invoked by ISM to ask for the authenticity of a session.
SessionProof—an operation invoked by user/device to provide the ISM with a proof of the session authenticity.
SessionApproved—an operation invoked by ISM to approve the user/device use the session.
SessionExpired—an operation invoked by ISM to deny a session due to service expiration.
SessionDepleted—an operation invoked by ISM to deny session due to service to depletion.
SessionFraudulent—an operation invoked by ISM to deny session due to lack of authenticity.

Operations Associated with Session Information

SessionProvideInfo—an operation invoked by user/device to provide session information such as expiration or usage.

SessionInfo—an operation invoked by ISM to provide the user/device with session information, which could be unsolicited as well.

Adaptation Layer

This layer concerns the actual mapping of the logical operations described into the existing wireless network.

Bootstrap Process

The following is a discussion of a typical bootstrap process according to the invention:

Once the device has been powered on and before the first network access attempt, either registration or call origination, the MS checks for the Wireless Session status. If a non-active Wireless Session status is detected, the MS then changes its state to "Bootstrap Process Initiated". The MS selects a bootstrap network identity and remains in the bootstrap state until a SessionGranted is received. The SessionGranted provides the mobile network identity, that is the assigned Mobile Station ID or MSID. It could also include a new SiwaKey or a derived key, such as an A-Key (e.g. in CDMA/TDMA/Analog). As an enhancement, the SessionGranted returns the bootstrap network identity back to the MS for a limited use, such as one time use or limited time use. This would enable occasional and bursty-data transmitters use the bootstrap network identifier for the duration of the data transmission, therefore conserve network identifiers.

Once provided by the ISM, the newly assigned network identity is programmed into the MS and the MS is required to re-initiate its network access using its new identity. In addition, the ISM can decide to invalidate the provided Wireless Session as a result of an expiration or usage depletion. The MS preferably always checks the Wireless Session status before re-initiating its network access.

The MS selects an MSID for use during the bootstrap process. This MSID is allocated from a plurality of bootstrap MSIDs known to the network. Different bootstrap MSID selection algorithm could apply using different allocation schemes, for example using carrier or national or global specific pools, location sensitive pools, etc. In the case of an MSID collision between two bootstrapping devices, either one of the colliding devices can be rejected from the network, i.e. an authentication failure. Once detected, the MS is required to initiate a new bootstrap process.

Optionally, the MS, once powered on and after scanning the available networks, interacts with the user to select the desired service provider. The MS then selects a bootstrap MSID known by the selected network.

Optionally, the bootstrap process can include a session purchase phase, where the user is acknowledged with a session promotion that could be purchased from the MS itself after certain user information is collected. In this case, the ISM sends a SessionPromote message to the MS. The MS returns a SessionPurchase message with the user information included, and a SessionGranted acknowledges the purchase in case of a successful purchase or a SessionDenied indicates a failure. The purchase phase can use any circuit and non-circuit data transport layer (e.g. SMS, USSD, GPRS, UMTS, CDMA, cdmaOnce and cdma2000) for message exchange between ISM and the MS. It can also be encapsulated in higher Likewise; in case the session was pre-purchased the bootstrap process can include a NULL session purchase phase, in which no SessionPromote or SessionPurchase messages are exchanged.

Figure 1B:
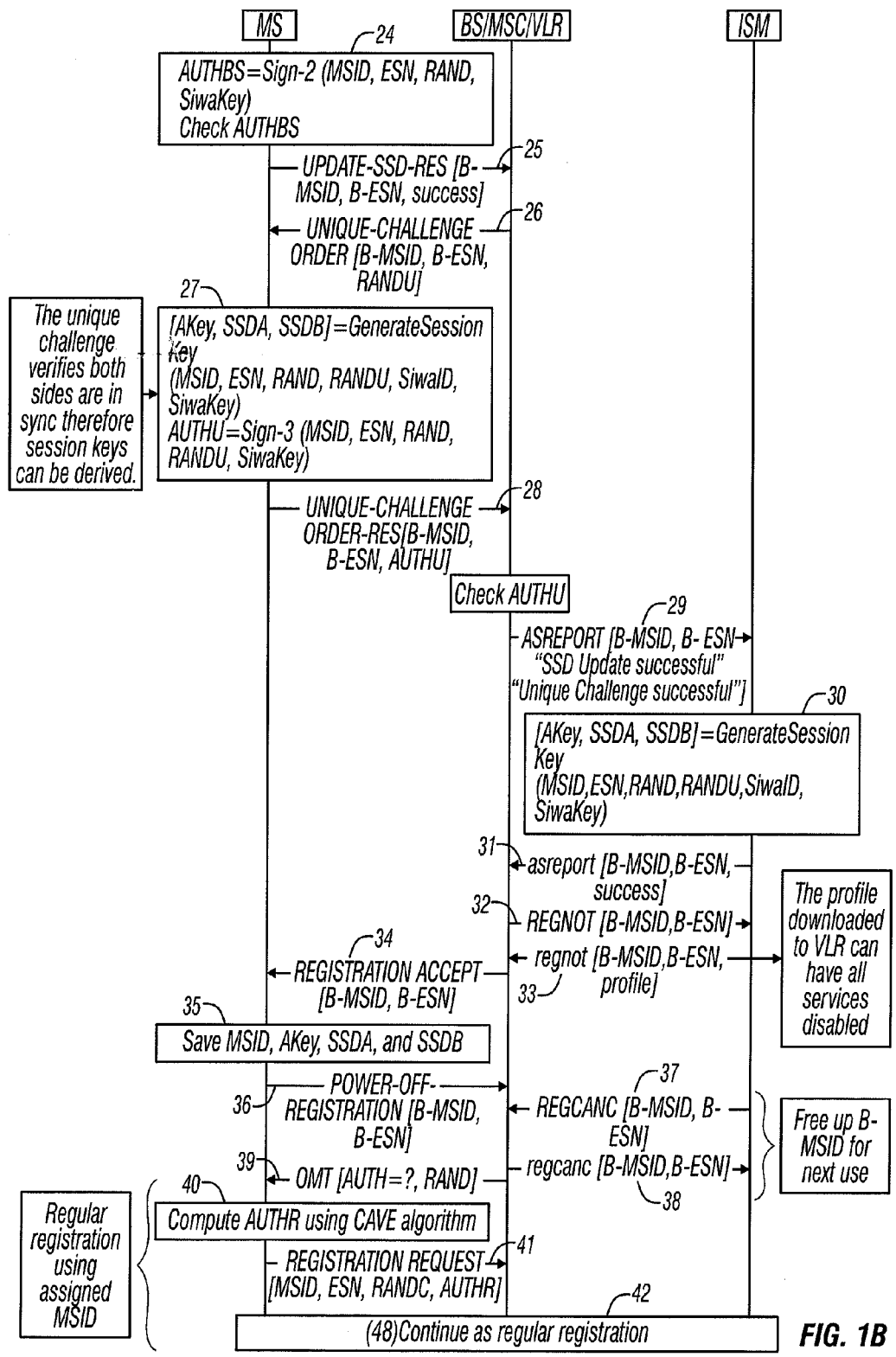

FIGS. 1A and 1B are a flow diagram of a bootstrap process for CDMA/TDMA/analog systems using an SSD update procedure and global challenge according to the invention. With regard to FIG. 1, the bootstrap process begins by generating a general bootstrap MSID, which allows the wireless device MS to access the network. The wireless device includes a proof of the SiwaID signed by SiwaKey and the global challenge when registering onto the network. The BS/MSC/VLR forwards an authentication request to the Intelligent Service Manager ISM. The ISM responds by initiating an SSD Update process via the network to the wireless device in which the device and ISM exchange additional access information. A unique challenge is used to verify that both sides of the communication, i.e. the wireless device and the ISM are in sync such that session keys between the pair can be derived. A profile is then downloaded to BS/MSC/VLR the network to complete the bootstrap registration process. At this point, the wireless device re-initiates a registration process using its new assigned network ID.

Figure 2A:
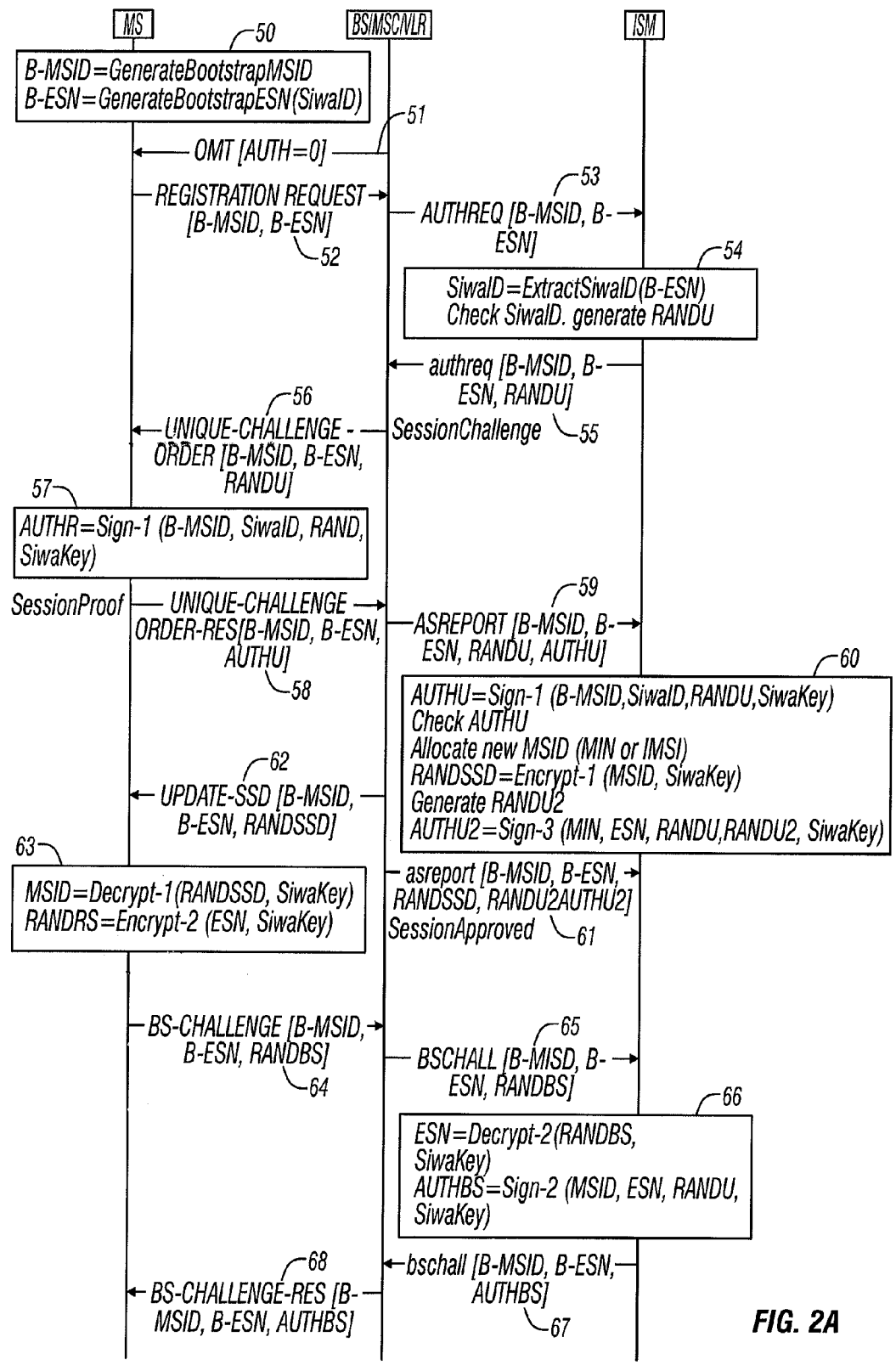
FIGS. 2A and 2B is a flow diagram of a bootstrap process for CDMA/TDMA/analog systems using an SSD update procedure with unique challenge according to the invention.
Figure 2B:
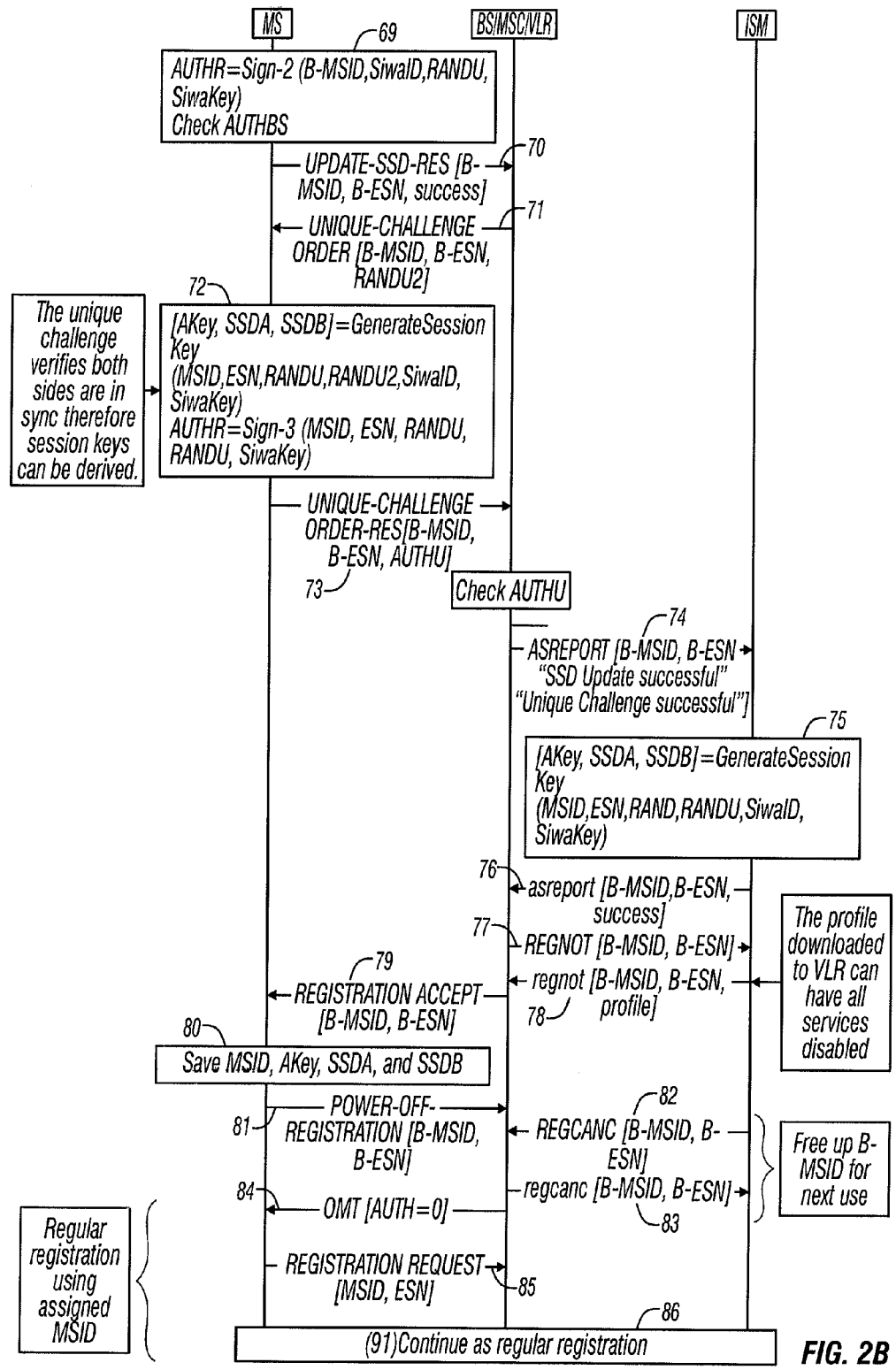

FIGS. 2A and 2B are a flow diagram of a bootstrap process for CDMA/TDMA/analog systems using an SSD update procedure with unique challenge according to the invention. With regard to FIG. 2, the bootstrap process begins by generating a general bootstrap MSID, which allows the wireless device MS to access the network. The BS/MSC/VLR retrieves unique challenge parameters from ISM and explicitly challenge the wireless device that respond with a proof of the SiwaID signed by SiwaKey. The BS/MSC/VLR forwards an authentication response to the ISM. The ISM responds by initiating an SSD Update process via the network to the wireless device in which the device and ISM exchange additional access information. An additional unique challenge is used to verify that both sides of the communication, i.e. the wireless device and the ISM are in sync such that session keys between the pair can be derived. A profile is then downloaded to BS/MSC/VLR the network to complete the bootstrap registration process. At this point, the wireless device re-initiates a registration process using its new assigned network ID.

Figure 3A:
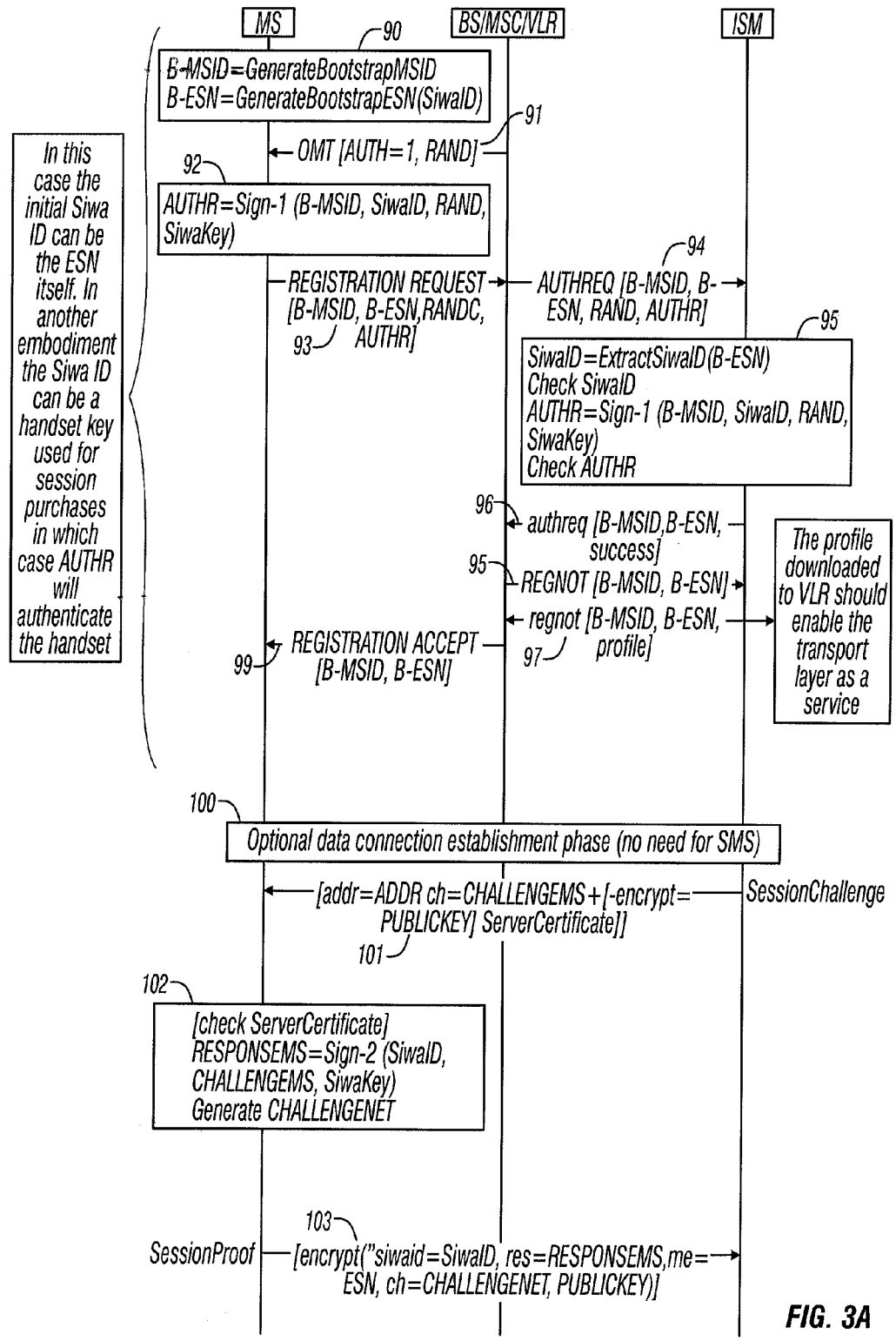
FIGS. 3A and 3B is a flow diagram of a bootstrap process for CDMA/TDMA/analog systems using a data transport bearer according to the invention.
Figure 3B:
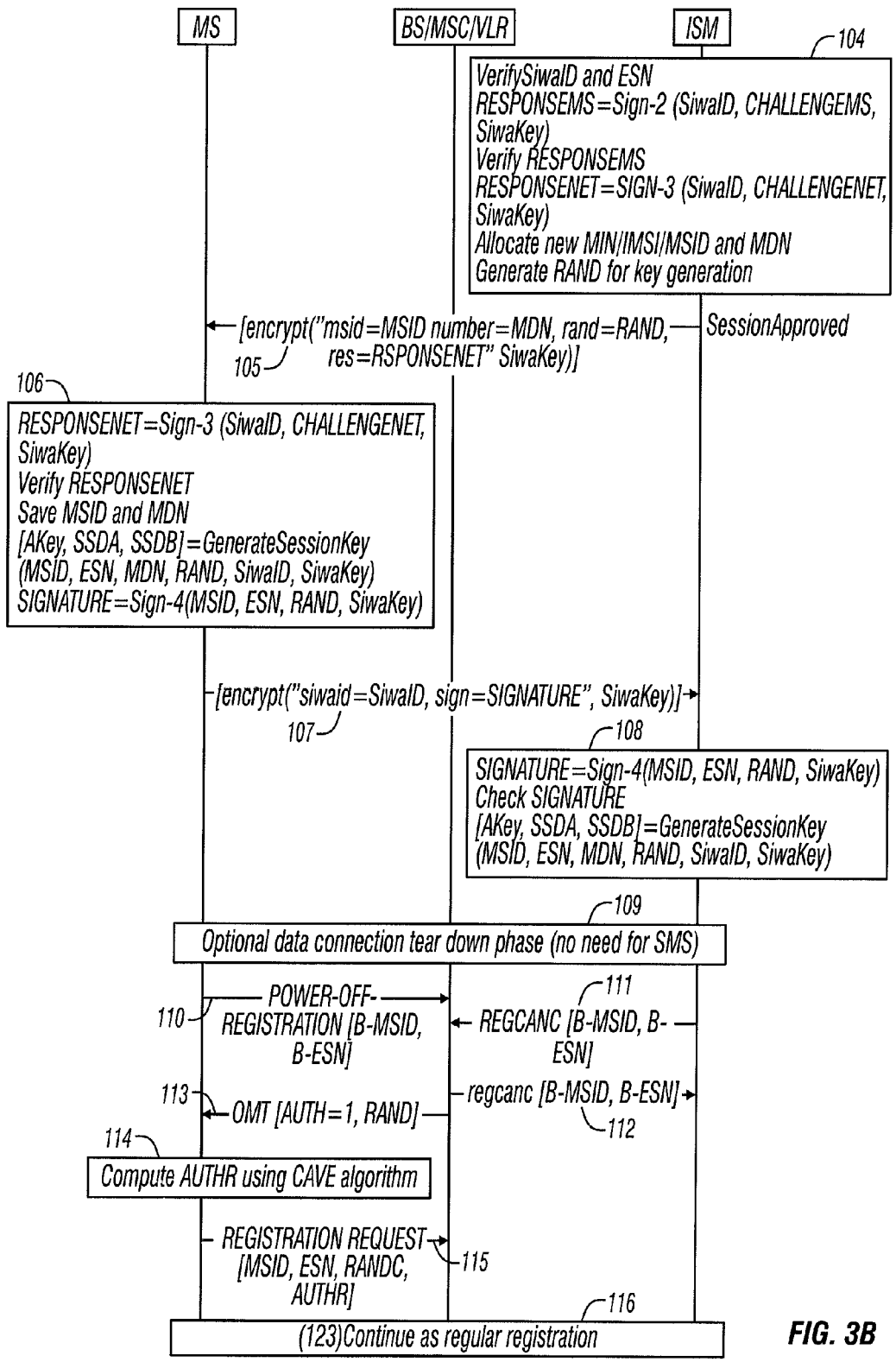

FIGS. 3A and 3B are a flow diagram of a bootstrap process for CDMA/TDMA/analog systems using a data transport bearer according to the invention. In FIG. 3, the bootstrap process proceeds as with the discussion in connection with FIG. 1 above. However, in this case, the initial identification of the MS can be the electronic serial number ESN signed by handset's manufacturer key. The ISM downloads a profile to the network that enables the transport layer as a service. Thereafter a data connection is established, if required. The data connection could be triggered either by ISM or by the MS. Alternatively, ISM can initiate additional SSD Update process as in FIG. 1 above where the RANDSSD contains a specific command instructing the MS to initiate a data connection to purchase a session. ISM and wireless device mutually authenticate each other and ISM assigns new network ID. An additional signature exchange is used to verify that both sides of the communication, i.e. the wireless device and the ISM are in sync such that session keys between the pair can be derived. At this point, the wireless device re-initiates a registration process using its new assigned network ID.

Figure 4A:
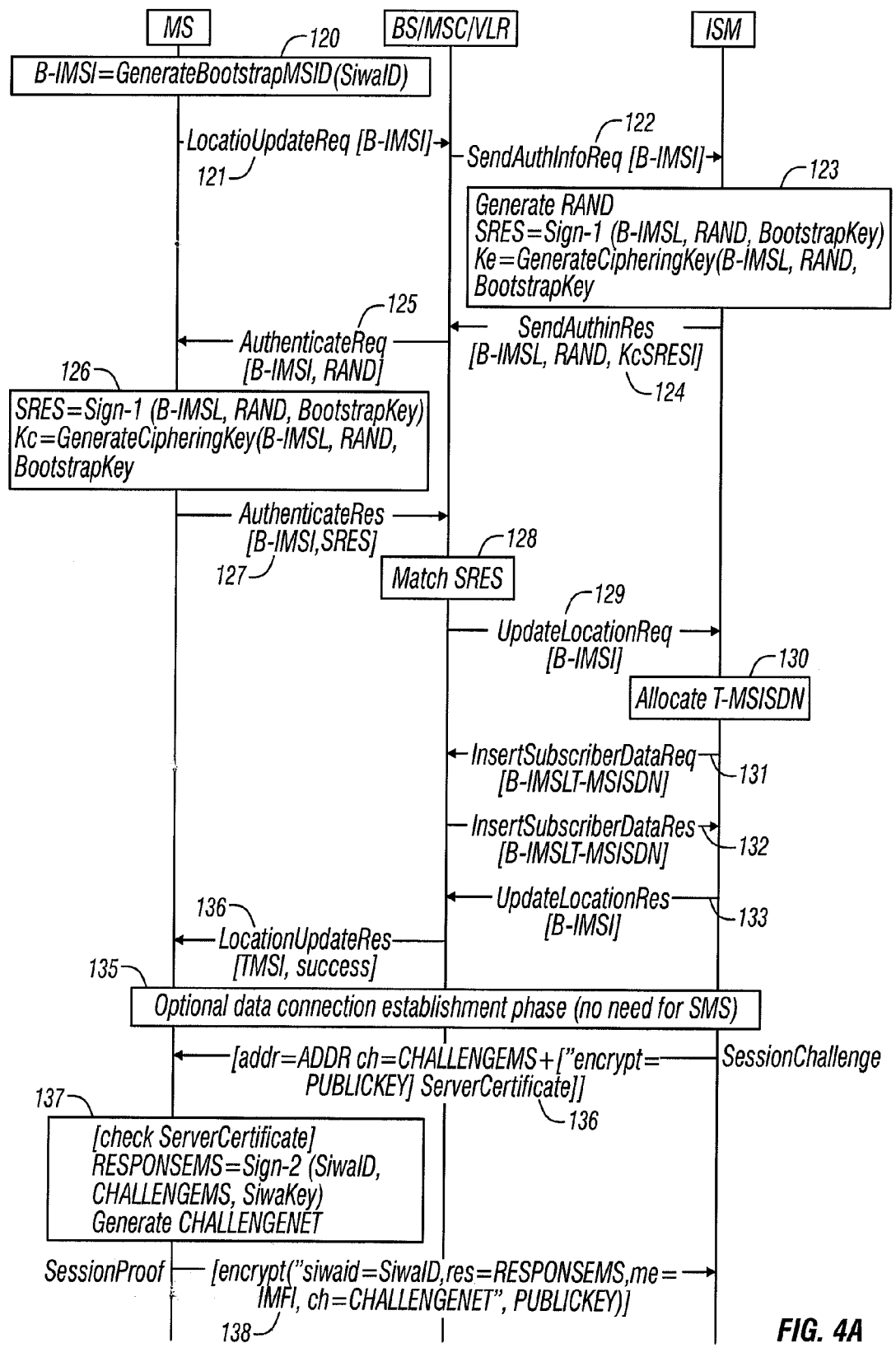
FIGS. 4A and 4B is a flow diagram of a bootstrap process for GSM systems using a data transport bearer according to the invention.
Figure 4B:
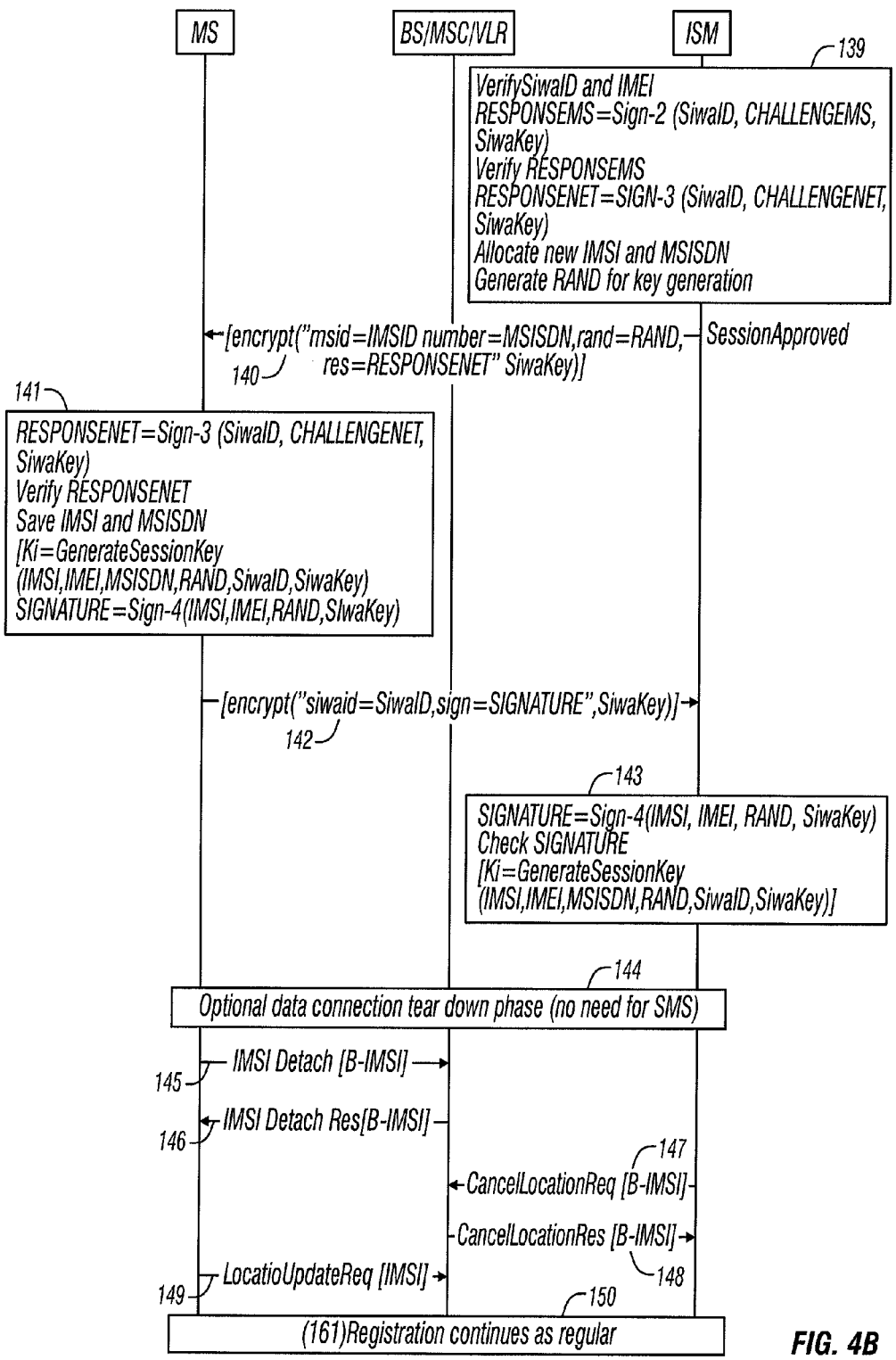

FIGS. 4A and 4B are a flow diagram of a bootstrap process for GSM systems using a data transport bearer according to the invention. In FIG. 4, the data transport layer can be SMS, GPRS, EDGE, UMTS, or a data call using a circuit switch. The data connection may be set-up by the network, or by the wireless device. In the case of SMS, there is no need for a set-up. Further, the system can add a message signature for message integrity. The authentication encryption may include standard cryptographic techniques such as x.509, anonymous RSA, Diffie-Hellman (WTLS) or IKE. Message sequence numbers may also be used to avoid message duplications.

Figure 5A:
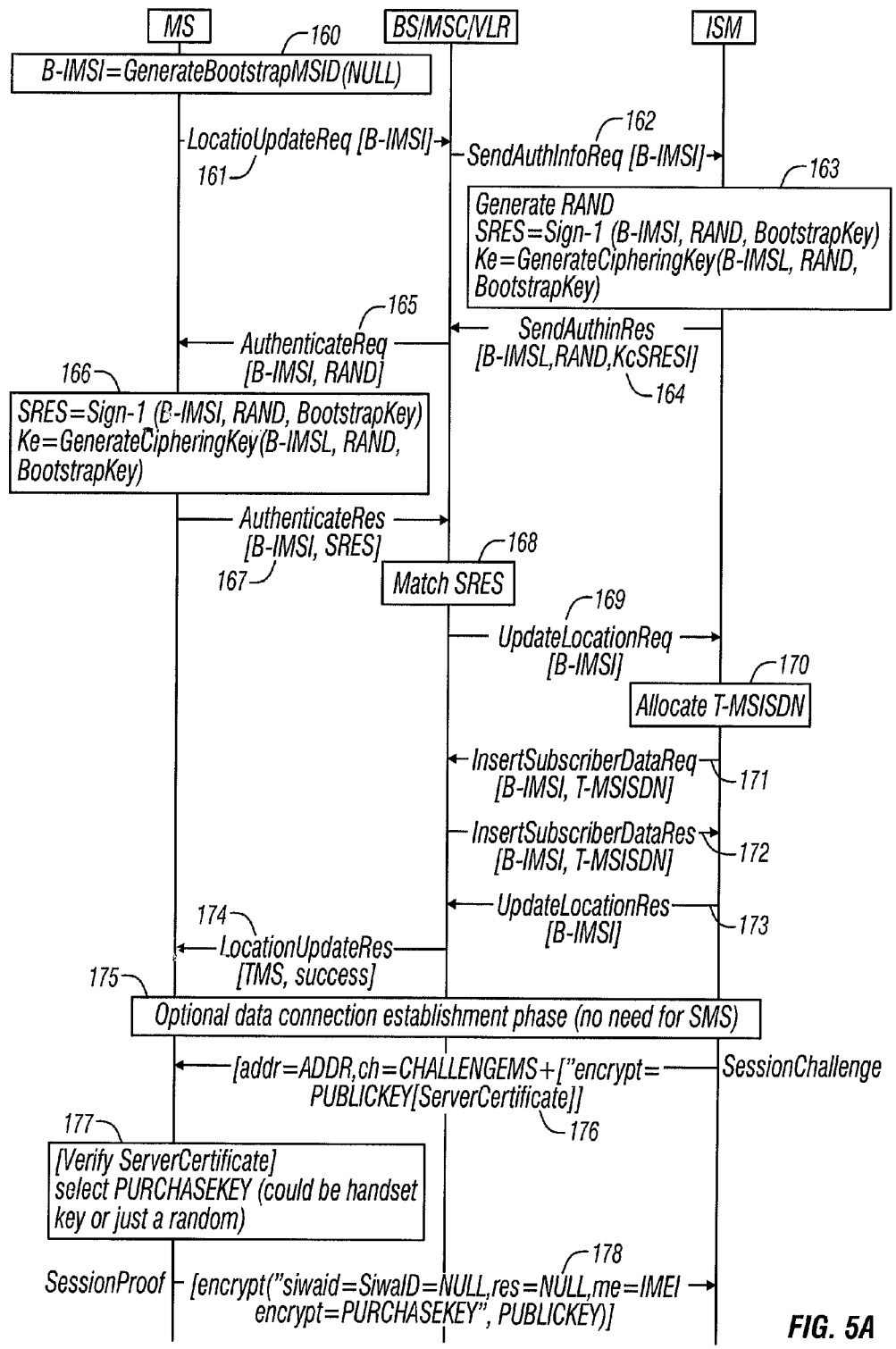
FIGS. 5A and 5B is a flow diagram of a bootstrap process for GSM systems using a data transport bearer and session purchase according to the invention.
Figure 5B:
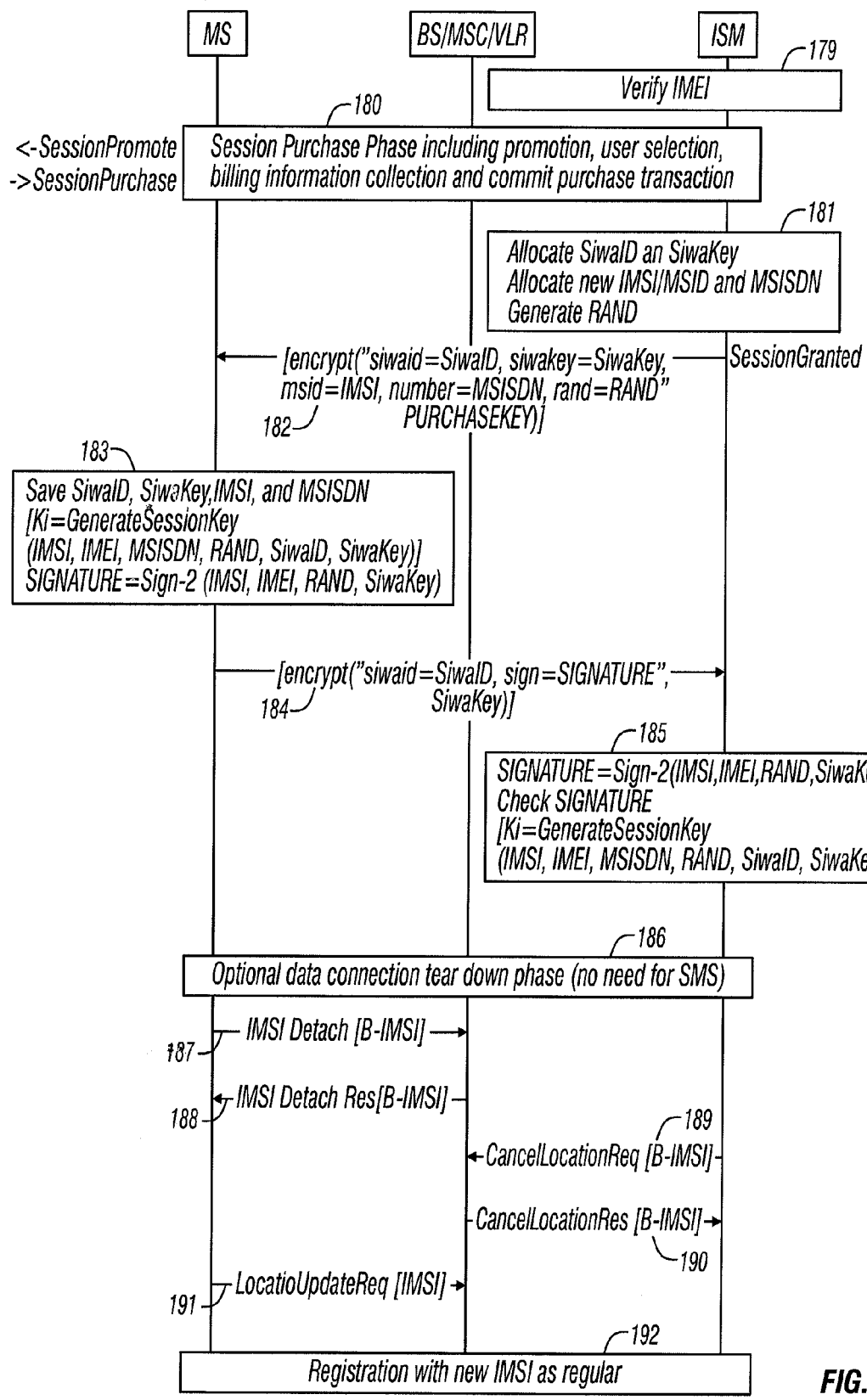

FIGS. 5A and 5B are a flow diagram of a bootstrap process for GSM systems using a data transport bearer and session purchase according to the invention. In connection with FIG.

5, it should be noted that the session purchase phase may include a promotion of several sessions each offers different service and payment methods where the purchase command preferable includes the chosen service and payment.

Figure 6A:
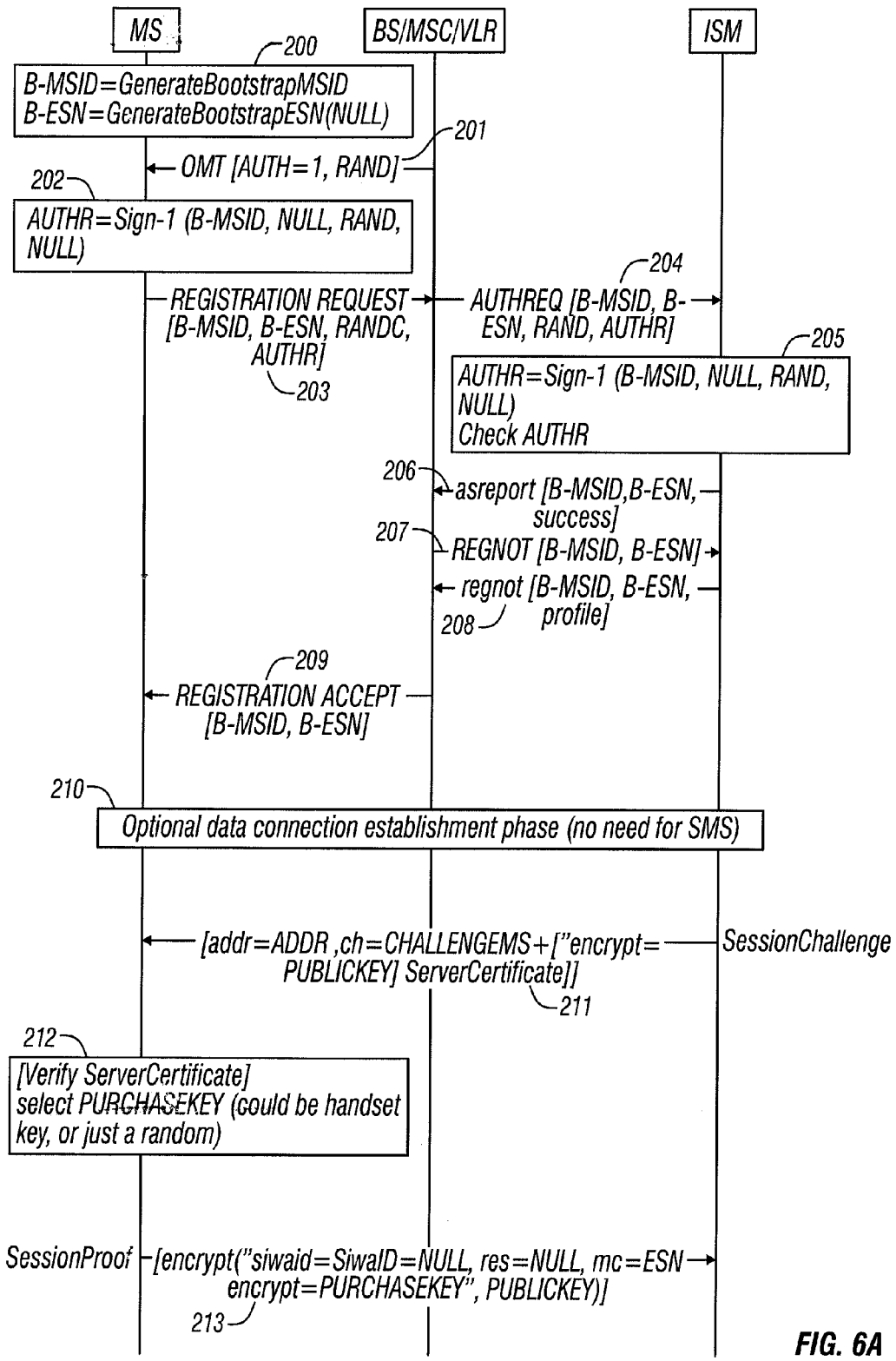
FIGS. 6A and 6B is a flow diagram of a bootstrap process for GSM systems using a data transport bearer and session purchase according to the invention.
Figure 6B:
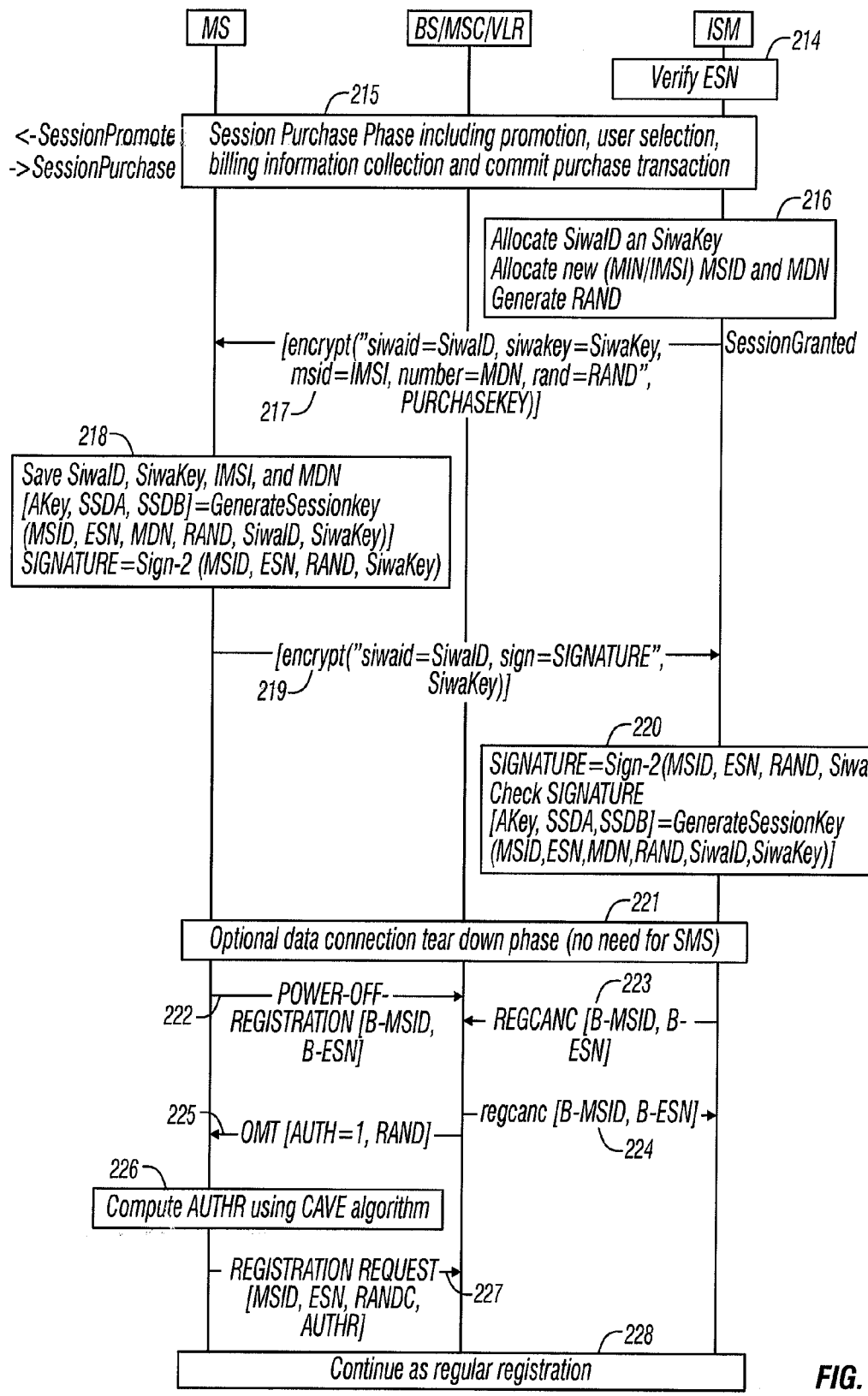

FIGS. 6A and 6B are a flow diagram of a bootstrap process for CDMA/TDMA/analog systems using a data transport bearer and session purchase according to the invention. In connection with FIG. 6, it should be noted the initial authentication at the first network access could authenticate the ESN and a manufacturer key thereby certifying the device.

FIGS. 1-6 are now discussed in greater detail with regard to the actual exchange of information between the wireless device MS, the network, BS/MS/VLR, and the intelligent service manager ISM.

In FIG. 1, the MS generate a B-MSID= GenerateBootstrapMSID B-ESN=GenerateBootstrapESN(SiwaID) 10. The BS/MSC/VLR, initiate a global challenge with an OMT [AUTH=1, RAND] 11. The MS generates an AUTHR=Sign-1 (B-MSID, SiwaID, RAND, SiwaKey) 12 and sends a REGISTRATION REQUEST [B-MSID, B-ESN, AUTHR] 13 which is forwarded via the network to the ISM using AUTHREQ [B-MSID, B-ESN, RAND, AUTHR] 13. The ISM extracts SiwaID from the B-ESN using SiwaID=ExtractSiwaID(B-ESN) 15, it then checks SiwaID in its database and verifies AUTHR=Sign-1 (B-MSID, SiwaID, RAND, SiwaKey) 15. ISM then, allocates new MSID (MIN or IMSI) 15 and embed it in RANDSSD=BuildNetCommand (MSID, SiwaKey) 15. ISM generates RANDU and computes AUTHU=Sign-3 (MSID, ESN, RAND, RANDU, SiwaKey) 15 and sends an authreq [B-MSID, B-ESN, RANDSSD, RANDU, AUTHU] 16 via the network, which is forwarded as UPDATE-SSD [B-MSID, B-ESN, RANDSSD] 17 to the wireless device. The MS extracts the new MSID from RANDSSD using MSID=ExtractNetCommand (RANDSSD, SiwaKey) 18. It will then embed the real ESN into RANDBS using RANDBS=BuildMSCommand (ESN, SiwaKey) and send it to the network using BS-CHALLENGE [B-MSID, B-ESN, RANDBS] 19 message which is forwarded as BSCHALL [B-MISD, B-ESN, RANDBS] 20 to the ISM. ISM extract the ESN using ESN=ExtractMSCommand (RANDBS, SiwaKey) 21, generate a signature AUTHBS=Sign-2 (MSID, ESN, RAND, SiwaKey) 21 is and a respond with bschall [B-MSID, B-ESN, AUTHBS] 22, which is forwarded by the network to the MS as BS-CHALLENGE-RES [B-MSID, B-ESN, AUTHBS] 23. The MS generate a similar signature AUTHBS=Sign-2 (MSID, ESN, RAND, SiwaKey) 24 and check both AUTHBS match. It then, sends an UPDATE-SSD-RES [B-MSID, B-ESN, success] 25 to the network, which then issues a unique challenge using UNIQUE-CHALLENGE-ORDER [B-MSID, B-ESN, RANDU] 26 to the MS. The MS derives new a session keys using [AKey,SSDA, SSDB]=GenerateSessionKey (MSID, ESN, RAND, RANDU, SiwaID, SiwaKey) 27, a signature AUTHU using AUTHU=Sign-3 (MSID, ESN, RAND, RANDU, SiwaKey) 27 and sends UNIQUE-CHALLENGE-ORDER-RES [B-MSID, B-ESN, AUTHU] 28 to the network which then matched by the network and an authentication report ASREPORT [B-MSID, B-ESN, "SSD Update Successful", "Unique Challenge Successful"] 29 is sent to the ISM. ISM then, derive session keys using [A Key,SSDA,SSDB]=GenerateSessionKey (MSID, ESN, RAND, RANDU, SiwaID, SiwaKey) 30 and respond with asreport [B-MSID, B-ESN, success] 10 to the network. The VLR then forward the registration request using REGNOT [B-MSID, B-ESN] 32 to ISM who download the service profile to VLR with a regnot [B-MSID, B-ESN, profile] 33 which is then forwarded as REGISTRATION ACCEPT [B-MSID, B-ESN] 34 to the MS. The MS saves the appropriate information Save MSID, Akey, SSDA and SSDB 35 and is then deregister itself from the network using POWER-OFF-REGISTRATION [B-MSID, B-ESN] 36. The ISM cancels the registration with REGCANC [B-MSID, B-ESN] 37 and receives acknowledgement from the network with regcanc [B-MSID, B-ESN] 38 so other MSs may use B-MSID. The BS/MSC/VLR, initiate a global challenge with an OMT [AUTH=1, RAND] 39 to the MS which computes the authorization, in this case using a CAVE algorithm Compute AUTHR using AUTHR=CAVE (MSID, ESN, SSDA, SSDB) 40 and sends a REGISTRATION REQUEST [MSID, ESN, RANDC, AUTHR] 41 to the network at this point registration continues as a regular registration 42.

In FIG. 2, the MS generate a B-MSID= GenerateBootstrapMSID B-ESN=GenerateBootstrapESN(SiwaID) 50. It, initiates a REGISTRATION REQUEST [B-MSID, B-ESN] 52 to BS/MSC/VLR. The BS/MSC/VLR send an AUTHREQ [B-MSID, B-ESN] 53 to ISM in order to authenticate the MS. The ISM extracts SiwaID from the B-ESN using SiwaID=ExtractSiwaID(B-ESN) 54, it then checks SiwaID in its database and generate an RANDU 54 to challenge the MS. ISM then, sends authreq [B-MSID, B-ESN, RANDU] 55 to BS/MSC/VLR. BS/MSC/VLR send UNIQUE CHALLENGE [B-MSID, B-ESN, RANDU] 56 to the MS. The MS generates an AUTHU=Sign-1 (B-MSID, SiwaID, RANDU, SiwaKey) 57 and sends a UNIQUE CHALLENGE RESPONSE [B-MSID, B-ESN, AUTHU] 58 which is forwarded via the network to the ISM using ASREPORT [B-MSID, B-ESN, RANDU, AUTHU] 59. ISM verifies AUTHU=Sign-1 (B-MSID, SiwaID, RANDU, SiwaKey). 60 matches the one received from the MS. It then, allocates new MSID (MIN or IMSI) 60 and embed it in RANDSSD=BuildNetCommand (MSID, SiwaKey) 60. ISM generates RANDU2 and computes AUTHU2=Sign-3 (MSID, ESN, RANDU, RANDU2, SiwaKey) 60. It sends an asreport [B-MSID, B-ESN, RANDSSD, RANDU2, AUTHU2] 61 via the network, which is forwarded as UPDATE-SSD [B-MSID, B-ESN, RANDSSD] 62 to the MS. The MS extracts the new MSID from RANDSSD using MSID=ExtractNetCommand (RANDSSD, SiwaKey) 63. It will then embed the real ESN into RANDBS using RANDBS=BuildMSCommand (ESN, SiwaKey) 63 and send it to the network using BS-CHALLENGE [B-MSID, B-ESN, RANDBS] 64, which is forwarded as BSCHALL [B-MISD, B-ESN, RANDBS] 65 to the ISM. ISM extract the ESN using ESN=ExtractMSCommand (RANDBS, SiwaKey) 66, generate a signature AUTHBS=Sign-2 (MSID, ESN, RAND, SiwaKey) 66 and respond with bschall [B-MSID, B-ESN, AUTHBS] 67, which is forwarded by the network to the MS as BS-CHALLENGE-RES [B-MSID, B-ESN, AUTHBS] 68. The MS generate a similar signature AUTHBS=Sign-2 (MSID, ESN, RANDU, SiwaKey) 69 and check both AUTHBS match. It then, sends an UPDATE-SSD-RES [B-MSID, B-ESN, success] 70 to the network. The BS/MSC/VLR issues a unique challenge using UNIQUE-CHALLENGE-ORDER [B-MSID, B-ESN, RANDU2 ] 71 to the MS. The MS derives new a session keys using [AKey,SSDA, SSDB]=GenerateSessionKey (MSID, ESN, RANDU, RANDU2, SiwaID, SiwaKey) 72, a signature AUTHU2 using AUTHU2=Sign-3 (MSID, ESN, RANDU, RANDU2, SiwaKey) 72 and issues a unique challenge response using UNIQUE-CHALLENGE-ORDER-RES [B-MSID, B-ESN, AUTHU2] 73 to the network which then matched by the network and an authentication report ASREPORT [B-MSID, B-ESN, "SSD Update Successful", "Unique Challenge Successful"] 74 is sent to the ISM. ISM then, derive session keys using [A Key,SSDA,SSDB]=GenerateSessionKey (MSID, ESN, RANDU, RANDU2, SiwaID, SiwaKey) 75 and respond with asreport [B-MSID, B-ESN, success] 76 to the network. The VLR then forward the registration request REGNOT [B-MSID, B-ESN] 77 to ISM who download the service profile to VLR with a regnot [B-MSID, B-ESN, profile] 78, which is then forwarded as REGISTRATION ACCEPT [B-MSID, B-ESN] 79 to the MS. The MS saves the appropriate information Save MSID, Akey, SSDA and SSDB 80 and is then deregister itself from the network using POWER-OFF-REGISTRATION [B-MSID, B-ESN] 81. The ISM cancels the registration with REGCANC [B-MSID, B-ESN] 82 and receives acknowledgement from the network with regcanc [B-MSID, B-ESN] 83 so other MSs may use B-MSID. The MS then sends REGISTRATION REQUEST [MSID, ESN] 84 to the network at this point registration continues as a regular registration.

In FIG. 3, bootstrap information is generated at the MS using B-MSID=GenerateBootstrapMSID B-ESN= GenerateBootstrapESN (SiwaID) 90 and the network responds OMT [AUTH=1, RAND] 91. The MS computes AUTHR=Sign-1 (B-MSID, SiwaID, RAND, SiwaKey) 92 and sends a REGISTRATION REQUEST [B-MSID, B-ESN, RANDC, AUTHR] 93 which is forwarded by the network to the ISM with AUTHREQ [B-MSID, B-ESN, RAND, AUTHR] 94. The ISM extracts SiwaID using SiwaID=ExtractSiwaID(B-ESN) 95 and check SiwaID in its database. It computes and checks AUTHR=Sign-1 (B-MSID, SiwaID, RAND, SiwaKey) 95 and sends authreq [B-MSID, B-ESN, success] 96 to BS/MSC/VLR. BS/MSC/VLR then, respond with REGNOT [B-MSID, B-ESN] 97 to the ISM. ISM downloads the MS profile information with regnot [B-MSID, B-ESN, profile] 98 and REGISTRATION ACCEPT [B-MSID, B-ESN] 99 is forwarded to the MS. At this point, an optional data connection establishment phase 100, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR,ch=CHALLENGEMS+ [encrypt=PUBLICKEY|ServerCertificate]] 101. MS may optionally check the ServerCertificate, compute a response using RESPONSEMS=Sign-2 (SiwaID, CHALLENGEMS, SiwaKey) 102. Optionally, the MS may generate a network challenge to authenticate ISM. The MS may choose to encrypt the message sent to ISM with ISM PUBLICKEY. It then, sends the message using [encrypt(siwaid=SiwaID, res=RESPONSEMS,me=ESN,ch=CHALLENGENET, PUBLICKEY)] 103. The ISM verifies SiwaID, verifies ESN and checks RESPONSEMS using RESPONSEMS=Sign-2 (SiwaID, CHALLENGEMS, SiwaKey) 104. It generates a network signature RESPONSENET using RESPONSENET=Sign-3 (SiwaID, CHALLENGENET, SiwaKey) 104. It then allocates new, MSID (MIN or IMSI) and MDN 104. It generates a RAND 104 used to derive session keys and sends a message to MS using [encrypt (msid=MSID,number=MDN,rand=RAND, res=RESPONSENET,SiwaKey)] 105. The MS verifies RESPONSENET=Sign-2 (SiwaID, CHALLENGENET, SiwaKey) 106, saves MSID and MDN and derives session keys using [A Key, SSDA, SSDB]=GenerateSessionKey (MSID, ESN, MDN, RAND, SiwaID SiwaKey) 106. It computes a SIGNATURE=Sign-4 (MSID,ESN,RAND,SiwaKey) 106 and sends a message to ISM [encrypt (siwaid=SiwaID,sign=SIGNATURE, SiwaKey)] 107. The ISM checks SIGNATURE=Sign-4 (MSID, ESN, RAND, SiwaKey) 108 and derive session keys [Akey,SSDA,SSDB]= GenerateSessionKey (MSID,ESN,MDN,RAND,SiwaID,SiwaKey) 108. At this time, if a data connection has been previously established it may be torn down 109. The MS is then deregisters from the network using POWER-OFF-REGISTRATION [B-MIN,B-ESN] 110. The ISM cancels the registration with REGCANC [B-MSID, B-ESN] 111 and receives acknowledgement from the network with regcanc [B-MSID, B-ESN] 112 so other MSs may use B-MSID. The BS/MSC/VLR, initiate a global challenge with an OMT [AUTH=1, RAND] 113 to the M$ which computes the authorization, in this case using a CAVE algorithm to compute AUTHR using AUTHR=CAVE (MSID, ESN, SSDA, SSDB) 114 and sends a REGISTRATION REQUEST [MSID, ESN, RANDC, AUTHR] 115 to the network at this point registration continues as a regular registration 116.

In FIG. 4, a Bootstrap Process is commenced by MS generating B-IMSI=GenerateBootstrapMSID(SiwaID) 120 and sending LocationUpdateReq [B-IMSI] 121 which is forwarded by the network to the ISM as SendAuthInfoReq [B-IMSI] 122. ISM generate RAND, compute a bootstrap signature using SRES=Sign-1 (B-IMSI, RAND, BootstrapKey) 123, generate a bootstrap ciphering key using Kc=GenerateCipheringKey(B-IMSI, RAND, BootstrapKey) 123 and sends this information using SendAuthInfRes [B-IMSI,RAND,Kc,SRES] 124 to VLR. The VLR sends AuthenticateReq [B-IMSI,RAND] 125 to the MS. The MS generates an authentication signature using SRES=Sign-1 (B-IMSI, RAND, BootstrapKey) 126, generate bootstrap ciphering key using Kc=GenerateCipheringKey(B-IMSI, RAND, BootstrapKey) 126 and sends authentication result using AuthenticateRes [B-IMSI,SRES] 127 which is then matched by the VLR to SRES provided by ISM 128. An UpdateLocationReq [B-IMSI] 129 is sent to the ISM by VLR. ISM allocates a temporary phone number T-MSISDN 130 and responds by downloading the subscriber's bootstrap profile to VLR using InsertSubscriberDataReq [B-IMSI, T-MSISDN] 131. VLR responds with InsertSubscriberDataRes [B-IMSI, T-MSISDN] 132. ISM sends UpdateLocationRes [B-IMSI] 133 to confirm the registration, which is forwarded to MS by the network using LocationUpdateRes [TMSI, SUCCESS] 134. At this point, an optional data connection establishment phase 135, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR, ch=CHALLENGEMS+ [encrypt=PUBLICKEY|ServerCertificate]] 136. MS may optionally check the ServerCertificate, compute a response using RESPONSEMS=Sign-2 (SiwaID, CHALLENGEMS, SiwaKey) 137. Optionally, the MS may generate a network challenge to authenticate ISM. The MS may choose to encrypt the message sent to ISM with ISM PUBLICKEY. It then, sends the message using [encrypt(siwaid=SiwaID, res=RESPONSEMS,me=IMEI,ch=CHALLENGENET, PUBLICKEY)] 138. The ISM verifies SiwaID, verifies IMEI and checks MS signature using RESPONSEMS=Sign-2 (SiwaID, CHALLENGEMS, SiwaKey) 139. It generate a network signature using RESPONSENET=Sign-3 (SiwaID, CHALLENGENET, SiwaKey) 139. It then allocates new MSID (i.e. IMSI) and MSISDN 139. In cases where B-IMSI is an already pre-assigned unique identifier ISM may return B-IMSI back to MS as the allocated IMSI. It generates a RAND 139 used to derive session keys and sends a message to MS using [encrypt(msid=MSID,number=MSISDN, rand=RAND,res=RESPONSENET,SiwaKey)] 140. The MS verifies RESPONSENET=Sign-2 (SiwaID, CHALLENGENET, SiwaKey) 141, saves IMSI and MSISDN. MS may optionally generate session key using Ki=GenerateSessionKey(IMSI, IMEI, MSISDN, RAND, SiwaID SiwaKey) 141. This key derivation could be avoided in cases where such a key is pre-assigned. It computes a SIGNATURE=Sign-4 (IMSI, IMEI, RAND, SiwaKey) 141 and sends a message to ISM [encrypt(siwaid=SiwaID, sign=SIGNATURE, SiwaKey)] 142. The ISM checks SIGNATURE=Sign-4 (IMSI, IMEI, RAND, SiwaKey) 143 and optionally generate session key using Ki=GenerateSessionKey(IMSI, IMEI, MSISDN, RAND, SiwaID SiwaKey) 143. At this point, if a data connection has been previously established it may be torn down 144. The MS is then deregisters from the network using IMSI DETACH [B-IMSI] 145, which is acknowledged by VLR using IMSI Detach Res [B-IMSI] 146. The ISM cancels the VLR bootstrap registration with CancelLocationReq [B-IMSI] 147 and receives acknowledgement from the network with CancelLocationRes [B-IMSI] 148 so other MSs may use B-IMSI. The MS initiate a registration with its new IMSI using LocationUpdatereq [IMSI] 149 to the network at this point registration continues as a regular registration 150.

In FIG. 5, a Bootstrap Process is commenced by MS generating B-IMSI=GenerateBootstrapMSID(NULL) 160 and sending LocationUpdateReq [B-IMSI] 161 which is forwarded by the network to the ISM as SendAuthInfoReq [B-IMSI] 162. ISM generate RAND, compute a bootstrap signature using SRES=Sign-1 (B-IMSI, RAND, BootstrapKey) 163, generate a bootstrap ciphering key using Kc=GenerateCipheringKey(B-IMSI, RAND, BootstrapKey) 163 and sends this information using SendAuthInfRes [B-IMSI,RAND,Kc,SRES] 164 to VLR. The VLR sends AuthenticateReq [B-IMSI,RAND] 165 to the MS. The MS generates an authentication signature using SRES=Sign-1 (B-IMSI, RAND, BootstrapKey) 166, generate bootstrap ciphering key using Kc=GenerateCipheringKey(B-IMSI, RAND, BootstrapKey) 166 and sends authentication result using AuthenticateRes [B-IMSI,SRES] 167 which is then matched by the VLR to SRES provided by ISM 168. An UpdateLocationReq [B-IMSI] 169 is sent to the ISM by VLR. ISM allocates a temporary phone number T-MSISDN 170 and responds by downloading the subscriber's bootstrap profile to VLR using InsertSubscriberDataReq [B-IMSI, T-MSISDN] 171. VLR responds with InsertSubscriberDataRes [B-IMSI, T-MSISDN] 172. ISM sends UpdateLocationRes [B-IMSI] 173 to confirm the registration, which is forwarded to MS by the network using LocationUpdateRes [TMSI, SUCCESS] 174. At this point, an optional data connection establishment phase 175, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR, ch=CHALLENGEMS+ [encrypt=PUBLICKEY|ServerCertificate]] 176. MS may optionally check the ServerCertificate, select a purchase session encryption key PURCHASE 177, this could be pre-assigned or using known PKI technique. The MS may choose to encrypt the message sent to ISM with ISM PUBLICKEY. It then, sends the message using [encrypt( siwaid=NULL, res=NULL,me=IMEI,encrypt=PURCHASEKEY,PUBLICKEY)] 178. At Session Purchase Phase 180, ISM and MS start message exchange to promote a session purchase and to collect user's selection and billing information and commit an online purchase transaction. Such a transaction can include credit authorization that may be required for postpaid subscribers. Once purchase transaction has been authorized ISM allocates new SiwaID and generates an associated SiwaKey 181. It then allocates new MSID (i.e. IMSI) and MSISDN 181. In cases where B-IMSI is an already pre-assigned unique identifier ISM may return B-IMSI back to MS as the allocated IMSI. ISM generates a RAND 181 used to derive session keys and sends a message to MS using [encrypt(siwaID=SiwaID, siwakey=SiwaKey,msid=IMSI,number=MSISDN, rand=RAND,PURCHASEKEY)] 182. The MS saves newly assigned SiwaID, SiwaKey, IMSI and MSISDN. MS may optionally generate session key using Ki=GenerateSessionKey(IMSI, IMEI, MSISDN, RAND, SiwaID SiwaKey) 183. This key derivation could be avoided in cases where such a key is pre-assigned. It computes a SIGNATURE=Sign-2 (IMSI, IMEI, RAND, SiwaKey) 183 and sends a message to ISM [encrypt(siwaid=SiwaID, sign=SIGNATURE, SiwaKey)] 184. The ISM checks SIGNATURE=Sign-2 (IMSI, IMEI, RAND, SiwaKey) 185 and optionally generate session key using Ki=GenerateSessionKey(IMSI, IMEI, MSISDN, RAND, SiwaID SiwaKey) 185. At this point, if a data connection has been previously established it may be torn down 186. The MS is then deregisters from the network using IMSI DETACH [B-IMSI] 187, which is acknowledged by VLR using IMSI Detach Res [B-IMSI] 188. The ISM cancels the VLR bootstrap registration with CancelLocationReq [B-IMSI] 189 and receives acknowledgement from the network with CancelLocationRes [B-IMSI] 190 so other MSs may use B-IMSI. The MS initiate a registration with its new IMSI using LocationUpdateReq [IMSI] 191 to the network at this point registration continues as a regular registration 192.

In FIG. 6, bootstrap information is generated at the MS using B-MSID=GenerateBootstrapMSID B-ESN=GenerateBootstrapESN (NULL) 200 and the network responds OMT [AUTH=1, RAND] 201. The MS computes AUTHR=Sign-1 (B-MSID, NULL, RAND, NULL) 202 and sends a REGISTRATION REQUEST [B-MSID, B-ESN, RANDC, AUTHR] 203 which is forwarded by the network to the ISM with AUTHREQ [B-MSID, B-ESN, RAND, AUTHR] 204. ISM optionally compute and check AUTHR=Sign-1 (B-MSID, NULL, RAND, NULL) 205 and sends authreq [B-MSID, B-ESN, success] 206 to BS/MSC/VLR. BS/MSC/VLR then, respond with REGNOT [B-MSID, B-ESN] 207 to the ISM. ISM downloads the MS profile information with regnot [B-MSID, B-ESN, profile] 208 and REGISTRATION ACCEPT [B-MSID, B-ESN] 209 is forwarded to the MS. At this point, an optional data connection establishment phase 210, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR, ch=CHALLENGEMS+ [encrypt=PUBLICKEY|ServerCertificate]] 211. MS may optionally check the ServerCertificate, select a purchase session encryption key PURCHASE 212, this could be pre-assigned or using known PKI technique. The MS may choose to encrypt the message sent to ISM with ISM PUBLICKEY. It then, sends the message using [encrypt( siwaid=NULL, res=NULL,me=ESN,encrypt=PURCHASEKEY,PUBLICKEY)] 213. At Session Purchase Phase 215, ISM and MS start message exchange to promote a session purchase and to collect user's selection and billing information and commit an online purchase transaction. Such a transaction can include credit authorization that may be required for postpaid subscribers. Once purchase transaction has been authorized ISM allocates new SiwaID and generates an associated SiwaKey 216. It then allocates new MSID (i.e. MIN or IMSI) and MDN 216. ISM generates a RAND 216 used to derive session keys and sends a message to MS using [encrypt(siwaID=SiwaID, siwakey=SiwaKey,msid=MSID, number=MDN,rand=RAND,PURCHASEKEY)] 217. The MS saves newly assigned SiwaID, SiwaKey, MSID and MDN. MS may derives session keys using [Akey,SSDA,SSDB]=GenerateSessionKey (MSID,ESN,MDN,RAND,SiwaID, SiwaKey) 218. It computes a SIGNATURE=Sign-2 (MSID, ESN, RAND, SiwaKey) 218 and sends a message to ISM [encrypt (siwaid=SiwaID,sign=SIGNATURE, SiwaKey)] 219. The ISM checks SIGNATURE=Sign-2 (MSID, ESN, RAND, SiwaKey) 220 and derive session keys using [Akey,SSDA, SSDB]=GenerateSessionKey (MSID,ESN,MDN,RAND,SiwaID, SiwaKey). At this point, if a data connection has been previously established it may be torn down 221. The MS is then deregisters from the network using POWER-OFF-REGISTRATION [B-MIN,B-ESN] 222. The ISM cancels the registration with REGCANC [B-MSID, B-ESN] 223 and receives acknowledgement from the network with regcanc [B-MSID, B-ESN] 224 so other MSs may use B-MSID. The BS/MSC/VLR, initiate a global challenge with an OMT [AUTH=1, RAND] 225 to the MS which computes the authorization, in this case using a CAVE algorithm to compute AUTHR using AUTHR=CAVE (MSID, ESN, SSDA, SSDB) 226 and sends a REGISTRATION REQUEST [MSID, ESN, RANDC, AUTHR] 227 to the network at this point registration continues as a regular registration 228.

FIGS. 7A through 7D show a bootstrap process using MIP (Mobile Internet Protocol) over an EV-DO (Evolution-Data Optimized) network.

Mobile IP

The development of wireless technology has triggered a corresponding proliferation of mobile computing, wherein mobile devices—wireless devices—move freely from one domain to another within a network such as the Internet. The proliferation of mobile computing led to the development of the Mobile Internet Protocol (MIP)—an enhancement to the Internet Protocol that allows for a device to roam on in IP network such as the Internet. Conventionally, a computing device's IP address is tied tightly to the network where the device is located. When a mobile device travels from its home location, the conventional system of routing according to IP address breaks down.

MIP provides enhancements to IP that allow transparent routing of IP datagrams to mobile nodes in the Internet. Each mobile node is always identified by its home address, regardless of its current point of attachment to the Internet. While situated away from its home, a mobile node is also associated with a care-of address, which provides information about its current point of attachment to the Internet. The protocol provides for registering the care-of address with a home agent. The home agent sends datagrams destined for the mobile node through a tunnel to the care-of address. After arriving at the end of the tunnel, each datagram is then delivered to the mobile node.

The home agent stores information about mobile nodes whose permanent address is in the home agent's network.

A foreign agent stores information about mobile nodes visiting its network. Foreign agents also advertise care-of addresses, which are used by Mobile IP. A node wanting to communicate with the mobile node uses the home address of the mobile node to send packets. These packets are intercepted by the home agent, which uses a table and tunnels the packets to the mobile node's care-of address with a new IP header, preserving the original IP header. The packets are de-capsulated at the end of the tunnel to remove the added IP header and delivered to the mobile node.

When acting as a sender, a mobile node simply sends packets directly to the other communicating node through the foreign agent. If needed, the foreign agent could employ reverse tunneling by tunneling packets for the mobile node to the home agent, which in turn forwards them to the communicating node.

Evolution-Data Optimized (EV-DO)

EV-DO (Evolution-Data Optimized) is a 3G (third generation) wireless radio broadband data standard that enables faster speeds than have been previously available in CDMA networks. EV-DO is the latest of a series of CDMA standards, following CDMA2000 and 1xRTTC.

In practice, mobile EV-DO users can expect download speeds of 400-700 Kbps, although air interface speeds of up to 2.4 Mbps with Rev. 0 and up to 3.1 Mb/s with Rev. A. EV-DO can enable zones of near pervasive computing, in which multiple devices are seamlessly networked with a constant high-speed Internet connection, allowing a user to have constant access to rich media applications and services such IPTV (Internet Protocol TV), VoIP (Voice over Internet Protocol and vlog (video blog) casting.

Figure 7A:
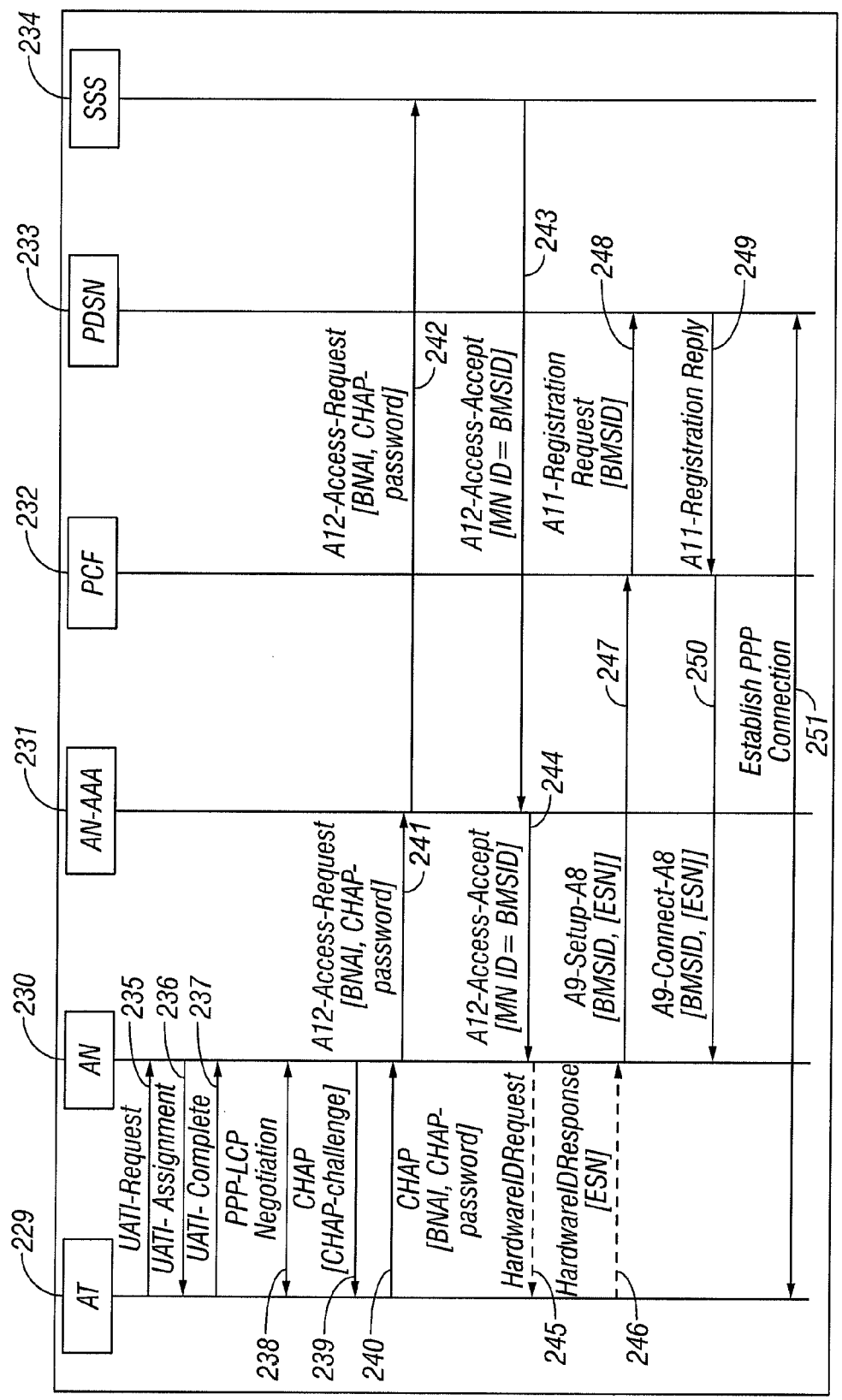
FIGS. 7A through 7D are flow diagrams of a bootstrap process using MIP (Mobile Internet Protocol) over an EV-DO (Evolution-Data optimized) network.

Turning now to FIG. 7A, shown is a flow diagram of a sub-process for registering a mobile device on an EV-DO network.

The AT 229 (access terminal, which, in the present embodiment, is the wireless device to be activated, initiates a session by directing a UATI (Unicast Acccess Terminal Identifier)-Request 235 to the AN 230 (access network base station). Preferably, the AT 229 determines a session seed using a pre-defined random number generator, seeded with a number based on the AT's hardware ID and sends it to the AN 230 in a UATI-Request message. The session seed is used to address the AT 229 until it is assigned a UATI.

The AN 230 then assigns and transmits 236 a UATI to the AT for the session. After the AT 229 receives the UATI, the AT 229 acknowledges receipt of the UATI by sending a UATI-Complete message 237 to the AN 230.

After the AT 229 is assigned a UATI, the AT 229 and the AN 230 configure a PPP link by means of the LCP (link control protocol) 238. In the present embodiment, both the sending and receiving devices send out LCP packets to determine specific information that the prospective data transmission will require. The LCP protocol:
  checks the identity of the linked device and either accepts or rejects the peer device;
  determines the acceptable packet size for transmission;
  searches for errors in configuration; and
  can terminate the link if requirements exceed the parameters.

After link establishment, using CHAP (Challenge Handshaking Authentication Protocol) the AN sends a challenge [CHAP-challenge] 239 to the AT. The AT, in turn responds to the CHAP-challenge 240 by supplying a BNAI (Bootstrap Network Access Identifier) and a CHAP password. The BNAI is constructed using a device unique identifier, activation session information and an activation realm. In one embodiment, the CHAP-password is a value calculated using a one-way hash function using secret information known only to the device and the activation server, the SSS 234 (Self-Service Server). In one embodiment, the activation session information is the BMSID (Bootstrap Mobile Subscriber Identifier) required by the network for mobility and billing purposes. After receiving the message from the AT 229, the AN 230 relays the message 241 via an A12-Access-Request to the AN-AAA 231 (Access Network Authentication, Authorization and Accounting server.) The AN-AAA 231 recognizes the activation realm of the AT in the BNAI and proxies the message to the SSS 234. The ordinarily skilled practitioner will recognized that "A12" is the designation for the CDMA interface that performs AN-level authentication of the AT device (by authenticating the results of a CHAP challenge/response operation invoked by the AN).

Upon receiving the message, the SSS 234, extracts the device unique identifier and activation session information from the BNAI, ensures the device is entitled to activation, extracts the activation session information and evaluates the CHAP password. If the CHAP password is what it is expected to be the SSS 234 returns 243 an A12-Access-Accept message [MN ID=BMSID]. In the access accept message the SSS 234 assigns a MN ID (Mobile Node ID) to the AT. Additionally, the MN ID is mapped to the BMSID. The A12-Access-Accept message is received by the AN-AAA and relayed 244 to the AN.

Upon receiving the A12-Access-Accept message, the AN 230 may optionally request the AT 229 hardware ID by directing a HardwareIDRequest 245 to the AT 229. The AT 229 responds by directing a HardwareIDResponse message [ESN] 246, containing the AT's electronic serial number (ESN) to the AN 230. In another embodiment, the AT provides a Mobile Equipment Identifier (MEID). In fact, any mention of an ESN herein below should be understood to refer to either an ESN or a MEID.

The AN 230 then directs an A9-Setup-A8 message [BMSID, [ESN]] including the BMSID and optionally the ESN if returned by the HardwareIDResponse 247 to the PCF 232 (Packet Control Function). Upon receiving the A9-Setup-A8 message, the PCF 232 directs an A11-RegistrationRequest [BMSID] 248 to the PDSN 233 (Packet Data Switching Node). If the registration request is accepted, the PDSN 233 returns an A11-RegistrationReply 249 to the PCF 232. The PCF 232 then returns an A9-Connect-A8 [BMSID, [ESN]] message 250 to the AN 230, whereupon a PPP (point-to-point protocol) connection is established 251 between the AT 229 and the PDSN 233. The ordinarily-skilled practitioner will understand that the PCF 232 is a functional element and may be part of the PDSN 233. In other embodiments, the PCF may be associated with other network elements distinct from the PDSN. The ordinarily skilled practitioner will understand that the PDSN 233 acts as the connection point between a radio access node and an IP network. The PDSN is responsible for managing a PPP session between the AN 229 and the mobile provider's core IP network.

Figure 7B:
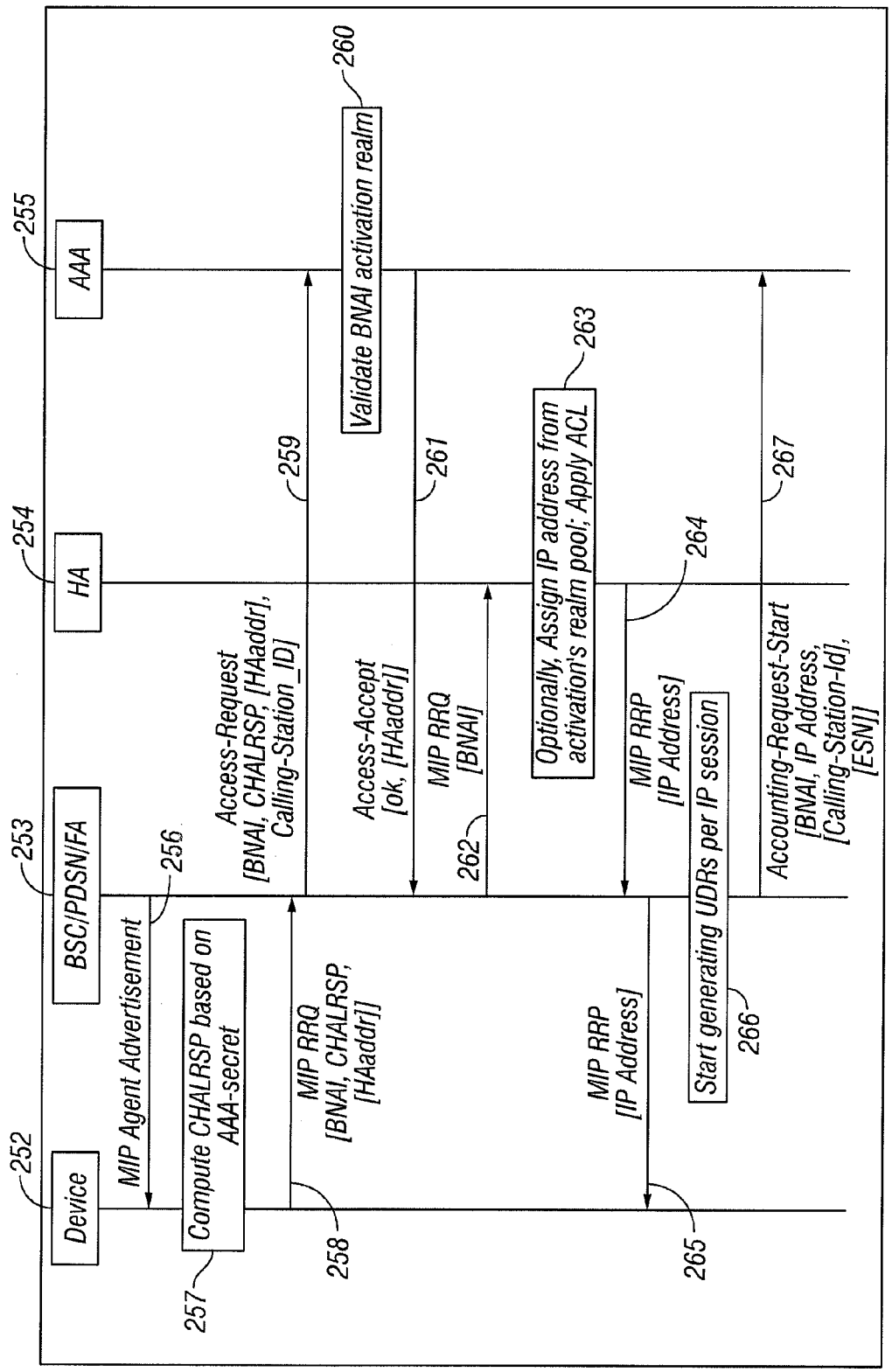

FIG. 7B provides a flow diagram of a sub-process wherein the wireless device 252 (previously, the AN) registers on a MIP network, is assigned an IP address and is granted limited access to an activation realm.

As above, A PPP connection is established between a wireless device (previously an AT 229) 252 and a PDSN 253. One or more mobility agents (BCS/PDSN/FA) advertise their presence on the network by directing MIP agent advertisement messages 256 to the wireless device 252. The wireless device 252 receives the agent advertisement messages and determines its point of attachment to the network.

The wireless device 252 computes a CHALRSP (challenge-response) 257 from its AAA secret. Having computed the CHALRSP, the device 252 directs a MIP RRQ message [BNAI, CHALRSP [HAaddr]] (registration request) 258 to BSC/PDSN/FA 253. The BSC/PDSN/FA 253 directs an Access-Request message [BNAI, CHALRSP [HAaddr] Calling-Station_Id] 259 to AAA 254, where the Calling-Station_Id is MN ID or BMSID provided to the PDSN A12-Access-Accept.

Upon receipt of the Access-Request message, the AAA 254, validates the BNAI activation realm. The AAA may optionally assign an HA IP address for the Mobile IP session (also called dynamic HA assignment). After validating the activation realm, AAA 254 returns an Access-Accept message [ok, [HAaddr]] 261 to the BSC/PDSN/FA 253. In one embodiment, the AAA 254 recognizes the activation realm in the BNAI of the AN, and proxies the Access Request message to the SSS with a CHALRSP computed from an AAA secret known only to the device and the SSS. The SSS then verifies the CHALRSP and returns Access-Accept back to the AAA. Upon receipt of the Access-Accept message, the BSC/PDSN/FA 253 routes MIP RRQ message [BNAI] (registration request) 262 to a HA (home agent) 254. The HA 254, recognizes the BNAI activation realm, assigns special ACL (Access Control List) to restrict IP traffic from the wireless device to the activation realm 263 only. The HA 254 may optionally assign the wireless device 252 an IP address from a designated activation realm IP pool. Following this, the HA 254 directs a MIP RRP message [IP Address] (registration reply) 264 to the BSC/PDSN/FA 253, which in turn routes the MIP RRP message 265 to the wireless device 252. The wireless device, having been assigned the IP address by the HA 254 is now granted limited access within the activation realm. The IP address having been assigned, the BSC/PDSN/FA 253 monitors activity related to the assigned IP address by generating Usage Detail Records (UDRs) for the IP address. Finally, the BSC/PDSN/FA 253 directs an Accounting-Request-Start message [BNAI, IP Address, [Calling-Station-Id] [ESN]] to the AAA 254.

Figure 7C:
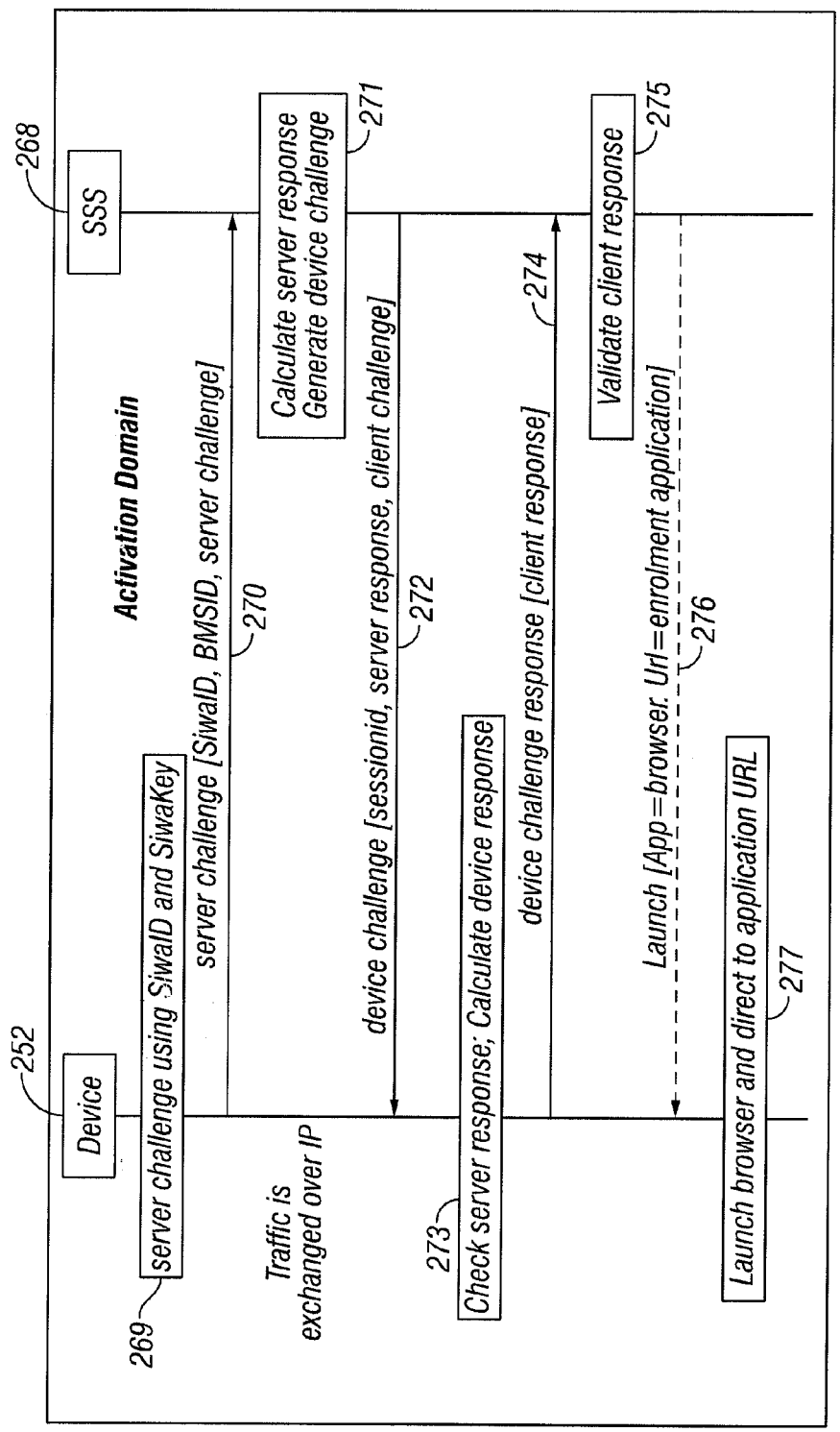

FIG. 7C provides a flow diagram of a mutual authentication process between a wireless device 252 and a SSS (Self-Service Server), known hereinafter as an enrollment server, 268 within the activation realm.

The wireless device 252 first issues a server challenge 269 using the SiwaID and SiwaKey, which have been previously described herein above. The wireless device 252 directs a server challenge [SiwaID, BMSID, server challenge] 270 to the SSS 268.

Upon receipt of the server challenge, the SSS 268 calculates a server response 271 and generates a device challenge [sessionid, server response, client challenge] 272.

The device 252, then checks the server response and calculates a device response 273. The device 252 then directs its device challenge response—client response—message 274 to the SSS 268. Thereupon, the SSS validates the device response 275. The SSS 268 may optionally instruct the device to launch [App, Url] 276 an application and providing the URL of the SSS enrollment application. In one embodiment, the application is a browser.

The device 252 receives the message, whereupon it launches its browser application and directs it to the SSS application URL 277.

Figure 7D:
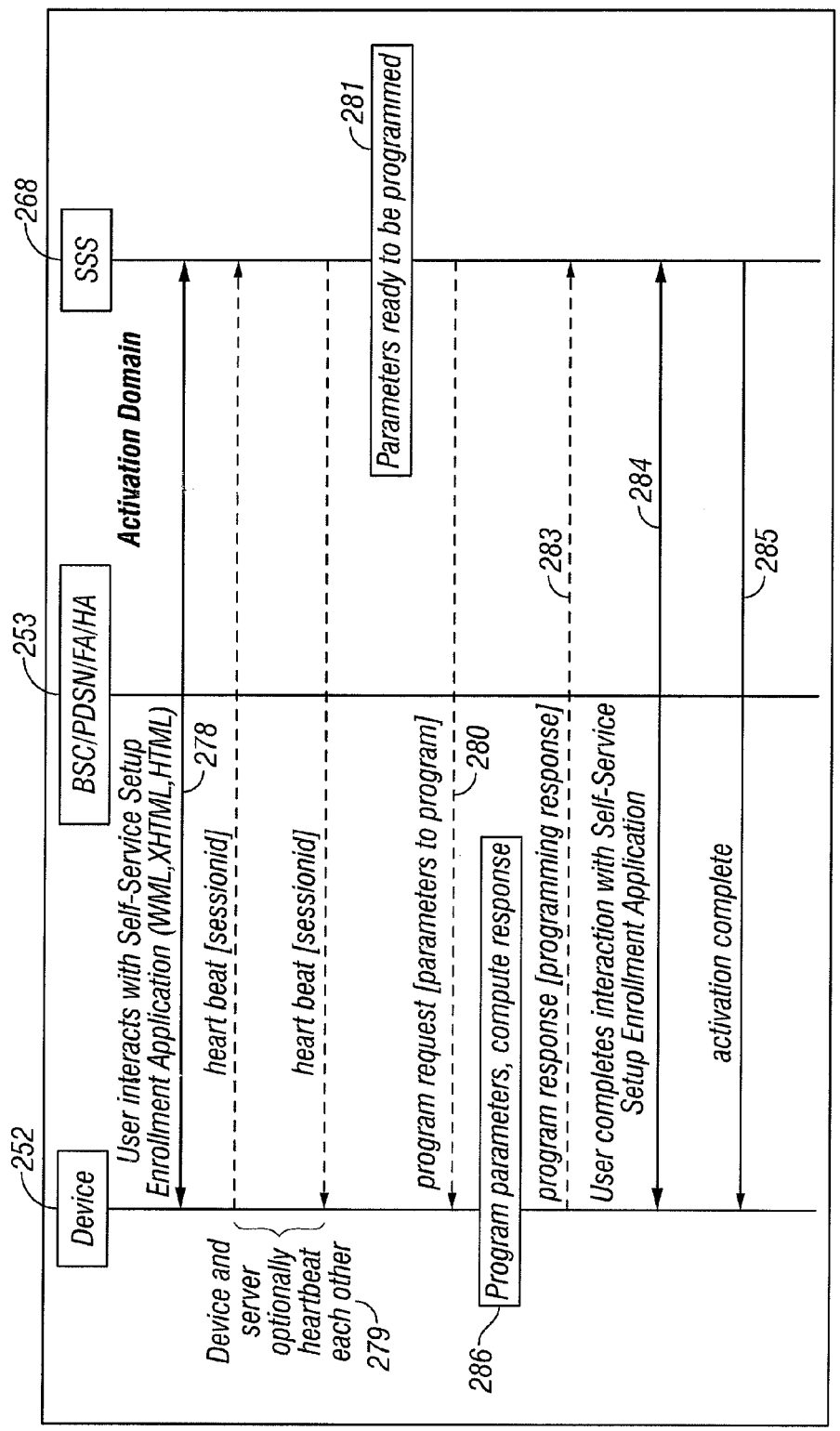

FIG. 7D provides a flow diagram of a sub-process wherein device parameters are assigned and programmed to the mobile device 252 and the activation process is terminated by SSS 268 sending an 'activation complete' message to the device. In one embodiment, the device is assigned a Network Access Identifier (NAI) and an SSS secret. In another embodiment the device is assigned an MSID. In another embodiment, the device is assigned a Mobile Device Number (MDN).

After authentication, the SSS 268 may optionally instruct the device to direct the user to a Self-Service Server Enrollment Application 278. The SSS 268 may select an Enrollment Application from a set of Enrollment Applications.

The user's interaction with the Enrollment Application may involve tasks related to session purchase. During the user's interaction with the sign-up application, the device 252 and the SSS 268 may exchange a heart beat at regular intervals, 279. The user then completes interaction with the signup application 284. In one embodiment, during the user interaction, the Self-Service Server Enrollment Application may request the SSS 268 to program device parameters 281 to the wireless device. The SSS 268 sends a program request [parameters to program message] 280 to the device. The device then programs the device parameters 282 and returns a program response [programming response] 283 to the SSS 268. The SSS validates the response and indicates the completion to the Self-Service Server Enrollment Application. 285 The user completes the sign-up process 284 with the Enrollment Application which then instructs the SSS 268 to terminate the activation session. The SSS 268 sends an activation complete message 285 to the device that terminates the session and the device is now ready to be used. In another embodiment, the SSS 268 may ask the device to send a program request [parameters to program] message to the device after the user finish interaction with the Enrollment Application. In another embodiment the SSS 268 may instruct the device to switch from one Enrollment Application to another by sending a launch [App, Url] message to the device thereby creating a sequence of distinct enrollment steps. For example, one Enrollment Application may involve tasks related to session purchase while another may involve device firmware update.

While the foregoing embodiment employs MIP in the network layer, an additional embodiment employs Simple IP (SIP) in the network layer. Additionally, the principles of the invention are equally applicable to other wireless technologies such as WiFi (Wireless Fidelity) or WiMAX (Worldwide Interoperability for Microwave Access).

The ordinarily-skilled practitioner will recognize that the format and content of the messages exchanged between the various components in the above description of the process of FIGS. 7A-7D are provided only to illustrate the principles of the invention, and are not intended to be limiting.

As with previously described embodiments, the activation process may involve other steps and sub-processes. Additionally, the server may provide the user with various forms of feedback, either during the activation process, or subsequently.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A bootstrap process for secure immediate wireless access by at least one non-active wireless device for exchange of information via one or more existing networks, comprising the steps of:
   upon being powered on, at least one wireless device checking its state; responsive to detection of a non-active state, said at least one non-active wireless device automatically requesting access to a wireless network, and, if said access request is accepted, being issued a limited profile from an enrollment server on said wireless network;
   using said limited profile, said at least one non-active wireless device automatically registering on said wireless network;
   from said wireless network said at least one wireless device automatically requesting access to an IP (internet protocol) network, wherein said at least one wireless device is assigned an IP address and granted access to said IP network, wherein said access to said IP network is limited to an activation realm for said non-active wireless device;
   said non-active wireless device having limited access to said activation realm automatically initiating contact with an enrollment server on said activation realm; and
   during an interaction with said enrollment server, assigning and programming device parameters to said wireless device;
   wherein when said assigning and programming are complete, said at least one non-active wireless device is activated; wherein the step of said at least one non-active wireless device requesting access to said wireless network and being issued a limited profile from a server on said wireless network comprises the steps of requesting a terminal identifier by said at least one non-active wireless device from an access node base station, and receiving said terminal identifier;
   said at least one non-active wireless device and said access node base station negotiating a data link;
   said access node base station issuing an authentication challenge to said at least one non-active wireless device;
   said at least one non-active wireless device responding to said to said challenge with a password and a Bootstrap Network Access Identifier (BNAI), wherein said BNAI is constructed using a unique device identifier, activation session information and an activation realm;
   said access node base station relaying said challenge response to an authentication server in an access request, wherein the authentication server recognizes the activation realm of the at least one non-active wireless device and proxies the access request to an activation server;
   said activation server extracting said unique device identifier and said activation session information from said BNAI, ensuring that the at least one non-active wireless device is entitled to activation, and, if said password is what it is expected to be, returning an access-accept message wherein a mobile node identifier (MN ID) is assigned to said least one non-active wireless device, wherein said MN ID is mapped to a Bootstrap Mobile Subscriber Identifier (BMSID); and
   receiving said access-accept message by said authentication server and relaying said access-accept message to the access node base station.

2. The process of claim 1, wherein said step of said at least one non-active wireless device automatically registering on said wireless network using said limited profile comprises the steps of;
   optionally, said access node base station requesting a hardware ID from said at least one non-active wireless device, wherein said wireless device responds with a message containing the wireless device's electronic serial number (ESN);
   said access node base station directing a setup message including the BMSID and, optionally, the ESN to a packet control function (PCF), whereupon said PCF directs a registration request to a Packet Data Switching Node (PDSN);

if it accepts said registration request, said PDSN directing a registration reply to said PCF, whereupon said PCF returns a connect message to the access base station, wherein a PPP connection is established between the at least one non-active wireless device and said PDSN.

3. The process of claim 1, wherein said step of said at least one wireless device automatically requesting access to an IP (internet protocol) network from said wireless network comprises the steps of:
one or more mobility agents (BCS/PDSN/FA) directing at least one MIP (mobile IP) agent advertisement to said at least one non-active wireless device, wherein said wireless device receives the at least one MIP agent advertisements and determines its point of attachment to said IP network;
said at least one non-active wireless device automatically directing a MIP registration request message including said BNAI activation realm to a BCS/PDSN/FA;
said BCS/PDSN/FA directing an access request including said BNAI activation realm to an Authentication/Authorization and Accounting server (AAA) on said IP network;
upon receipt of the access request, said AAA validating said BNAI activation realm and returning an access accept message to said BCS/PDSN/FA;
said BCS/PDSN/FA routing a MIP registration request to a Home Agent (HA); said HA recognizing said BNAI activation realm and assigning an Access Control list (ACL) to restrict traffic from the at least one non-active wireless device to the activation realm only; and
said HA directing a MIP registration reply to the BCS/PDSN/FA; the BCSIPDSNIFA in turn routing the MIP registration reply to the at least one non-active wireless device;
wherein the at least one non-active wireless device, having been assigned an IP address, is granted limited access to said IP network within said activation realm.

4. The process of claim 3, further comprising the step of:
said AAA optionally assigning a HA IP address for the MIP session.

5. The process of claim 3, further comprising the steps of:
the BSC/PDSN/FA monitoring activity related to the assigned IP address by generating Usage Detail Records (UDRs) of the IP address; and
directing an Accounting-Request-Start to the AAA.

6. The method of claim 1, wherein said step of said at least one non-active wireless device having limited access to said activation realm automatically initiating contact with an enrollment server on said activation realm comprises the step of:
said at least one non-active wireless device and said enrollment server mutually authenticating each other.

7. The process of claim 6, wherein said step of said at least one non-active wireless device and said enrollment server mutually authenticating each other comprises the steps of:
said at least one non-active wireless device issuing a server challenge including a Secure Instant Wireless Access ID (Siwa. ID) and the BMSID;
said enrollment server calculating a server response and generating a device challenge, including a session ID, server response and client challenge;
said at least one non-active wireless device checking said server challenge and calculating a device response and directing a device response challenge to the enrollment server; and
said enrollment server validating said device response, whereupon said wireless device is authenticated on said enrollment server.

8. The process of claim 7, further comprising the steps of:
said enrollment server optionally instructing said at least one non-active wireless device to launch a client application providing URL of an enrollment application;
said device receiving said instruction and launching a client application and directing said client application to said enrollment application.

9. The process of claim 8, wherein said client application comprises a browser.

10. The process of claim 1, wherein said step of assigning and programming device parameters to said wireless device during an interaction with said enrollment server comprises the steps of:
directing a request to said enrollment server to program device parameters to said at least one non-active wireless device;
said enrollment server sending a program request to said at least one non-active wireless device including parameters to program;
said device programming itself with said included parameters to program and returning a programming response to said enrollment server; and
said server validating said programming response and indicating activation completion to a self-service signup application.

11. The process of claim 10, further comprising the steps of:
said enrollment server optionally instructing said at least one non-active wireless device to direct a user of said device to said self-service signup application, wherein said enrollment server may select a self-service signup application from a set of enrollment applications;
said user interacting with said self-service signup application to perform tasks related to session purchase; and
said at least one non-active wireless device and said enrollment server exchanging a heartbeat at regular intervals during the user interaction.

12. The process of claim 10, wherein said at least one non-active wireless device is assigned any of:
a Network Access Identifier (NAI);
an AAA (Authentication-Authorization-Accounting) secret;
a Mobile Device Number (MDN); and a Mobile Subscriber Identifier (MSID).

13. The process of claim 1, wherein said activation session information comprises a Bootstrap Mobile Subscriber Identifier (BMSID) required by said network for mobility and billing purposes.

14. The process of claim 1, wherein said wireless network comprises any of a EV-DO (Evolution-Data Optimized), WiFi (Wireless Fidelity) and WIMAX (Worldwide Interoperability for Microwave Access).

15. The process of claim 1, wherein a network protocol for interaction with said IP network comprises any of SIP (simple IP) and MIP (mobile IP).

16. The process of claim 1, wherein said at least one non-activated wireless device is provided either of limited and unlimited access to said wireless network after activation.

17. The process of claim 1, further comprising any of the steps of: providing service to a user without a need for manual provision of accounts;
providing said wireless device with immediate access to said wireless network; and providing access to services offered by a wireless service provider to said user at the time they are needed by said user.

18. The process of claim 1, further comprising the steps of:

said non-active wireless device selecting a wireless network before a network access attempt;

responsive to detection of a non-active state, said non-active wireless device changing its state to indicate that a bootstrap process is initiated.

19. The process of claim 1, wherein said at least one non-active wireless device remains in a bootstrap state until a network identity is granted.

20. The process of claim 19, wherein said network identity grants user limited use which comprises any of:

a one time use, limited time use and limited usage use.

21. The process of claim 19, further comprising the step of:

said activated wireless device re-initiating its network access using its new identity.

* * * * *